US007757166B2

(12) United States Patent
Nelson et al.

(10) Patent No.: US 7,757,166 B2
(45) Date of Patent: Jul. 13, 2010

(54) SYSTEM AND METHOD FOR YEARBOOK CREATION

(75) Inventors: Gary Lee Nelson, Burnsville, MN (US);
Eric J. Loring, Topeka, KS (US); Xia Chen, Edina, MN (US); Timothy M. Larson, Prior Lake, MN (US)

(73) Assignee: Jostens, Inc., Minneapolis, MN (US)

( * ) Notice: Subject to any disclaimer, the term of this patent is extended or adjusted under 35 U.S.C. 154(b) by 0 days.

(21) Appl. No.: 11/009,612

(22) Filed: Dec. 10, 2004

(65) Prior Publication Data
US 2006/0129924 A1    Jun. 15, 2006

(51) Int. Cl.
*G06F 17/00* (2006.01)
(52) U.S. Cl. .................. 715/243; 715/202; 715/255; 715/200; 709/206
(58) Field of Classification Search .......... 715/500, 715/517, 513, 530, 500.1, 200, 203, 234, 715/243, 255; 709/206; 705/1; 707/100
See application file for complete search history.

(56) References Cited

U.S. PATENT DOCUMENTS

| | | | | | |
|---|---|---|---|---|---|
| 3,892,427 | A | * | 7/1975 | Kraynak et al. | 281/15.1 |
| 4,877,269 | A | * | 10/1989 | Callaghan et al. | 283/40 |
| 5,114,291 | A | * | 5/1992 | Hefty | 412/8 |
| 5,181,162 | A | * | 1/1993 | Smith et al. | 715/530 |
| 5,190,316 | A | * | 3/1993 | Hefty | 281/15.1 |
| 5,220,657 | A | * | 6/1993 | Bly et al. | 711/152 |
| 5,293,475 | A | * | 3/1994 | Hennigan et al. | 715/517 |
| 5,323,312 | A | * | 6/1994 | Saito et al. | 715/513 |
| 5,390,354 | A | * | 2/1995 | de Heus et al. | 715/517 |
| 5,434,961 | A | * | 7/1995 | Horiuchi et al. | 715/507 |
| 5,475,805 | A | * | 12/1995 | Murata | 715/513 |
| 5,478,120 | A | * | 12/1995 | D'Andrea | 283/117 |
| 5,513,117 | A | * | 4/1996 | Small | 700/233 |
| 5,517,621 | A | * | 5/1996 | Fukui et al. | 715/517 |
| 5,524,932 | A | * | 6/1996 | Kalisher | 283/67 |
| 5,555,362 | A | * | 9/1996 | Yamashita et al. | 715/517 |
| 5,652,421 | A | * | 7/1997 | Veeneman et al. | 235/381 |
| 5,729,674 | A | * | 3/1998 | Rosewarne et al. | 345/634 |
| 5,850,520 | A | * | 12/1998 | Griebenow et al. | 709/206 |
| 5,953,733 | A | * | 9/1999 | Langford-Wilson | 715/517 |
| 6,005,560 | A | * | 12/1999 | Gill et al. | 715/500.1 |
| 6,088,702 | A | * | 7/2000 | Plantz et al. | 707/103 R |
| 6,123,362 | A | * | 9/2000 | Squilla et al. | 283/67 |
| 6,134,568 | A | * | 10/2000 | Tonkin | 715/209 |

(Continued)

*Primary Examiner*—Doug Hutton
*Assistant Examiner*—James H Blackwell
(74) *Attorney, Agent, or Firm*—Dorsey & Whitney LLP; Alicia Griffin Mills

(57) ABSTRACT

A yearbook system is provided. The yearbook system provides a single, extensive resource to plan, create, educate about, sell, and distribute yearbooks. The system further provides an integrated yearbook system management and yearbook production system to enable the production of the yearbook to a printed output. A yearbook server hosts a client site and a client database. The client site is enables the school to plan, create, sell and distribute a yearbook. Further, their system may be used to create the yearbook online. A production server hosts a production database synchronizes with the yearbook server, providing images to the client for use in creating the yearbook, and accepting completed created pages submitted by the school from the yearbook server. The production server translates the created pages into the format to proceed through the regular preparation for production of the yearbook.

25 Claims, 35 Drawing Sheets

U.S. PATENT DOCUMENTS

| | | | | |
|---|---|---|---|---|
| 6,138,106 | A * | 10/2000 | Walker et al. | 705/14 |
| 6,142,530 | A * | 11/2000 | Emmerich | 283/63.1 |
| 6,161,113 | A * | 12/2000 | Mora et al. | 715/234 |
| 6,366,918 | B1 * | 4/2002 | Guttman et al. | 707/100 |
| 6,370,514 | B1 * | 4/2002 | Messner | 705/14 |
| 6,505,202 | B1 * | 1/2003 | Mosquera et al. | 707/10 |
| 6,507,845 | B1 * | 1/2003 | Cohen et al. | 707/100 |
| 6,632,251 | B1 * | 10/2003 | Rutten et al. | 715/530 |
| 6,683,611 | B1 * | 1/2004 | Cleveland | 345/471 |
| 6,826,534 | B1 * | 11/2004 | Gupta et al. | 705/1 |
| 6,826,727 | B1 * | 11/2004 | Mohr et al. | 715/517 |
| 6,898,601 | B2 | 5/2005 | Amado et al. | |
| 7,107,249 | B2 * | 9/2006 | Dively et al. | 705/74 |
| 7,209,889 | B1 * | 4/2007 | Whitfield | 705/14 |
| 2002/0077848 | A1 * | 6/2002 | Campbell | 705/1 |
| 2003/0056177 | A1 * | 3/2003 | Nara et al. | 715/525 |
| 2003/0078856 | A1 * | 4/2003 | Zubi | 705/26 |
| 2005/0055624 | A1 * | 3/2005 | Seeman et al. | 715/500 |
| 2006/0031746 | A1 * | 2/2006 | Toepfer et al. | 715/500 |

* cited by examiner

PLAN - COMMUNITY PHOTO SITE ⤹ 96 jostens Yearbook Avenue™

Topeka 9 Y Job: 60127
Welcome Yearbook Adviser 21-JUL-04
Sign Out   Edit Personal Login   Search

Photo Submission on Web Site

Do you want to have a Web site for parents and others to upload photos for the yearbook staff's use?  ☐

Enter a start date when the site becomes available: ☐ (MM/DD/YYYY) — 98

Enter an end date when the site is turned off: ☐ (MM/DD/YYYY) — 100

The user id for your Web site is: 7000038 — 102

Enter the password for you Web Site: — 104

Enter the maximum number of images to be submitted: ☐ (400 or less) — 106

Number of images submitted:

Do you want the site enabled? ☐

The location for your Web site is: https://demoportal.jostens.com/login.asp — 108

[Save]

FIG. 7

PLAN - STAFF

Yearbook Avenue™ — 110

Topeka 9 Y Job: 60127
Welcome Yearbook Adviser 21-JUL-04
Sign Out   Edit Personal Login   Search

Maintain Yearbook Staff

*Last Name         *First Name         Email Address
Add new staff member here                                    [ADD] — 114

Padmanabhan   Devan                                          [UPDATE] [DELETE]
— 116
*Denotes required field

FIG. 8

PLAN - SCHOOL INFO

Topeka 9 Y Job: 60127 jostens Yearbook Avenue™

Welcome Yearbook Adviser 21-JUL-04

Sign Out    Edit Personal Login    Search

—118

120 — Topeka 9 Y
112 { Address: 7000 S Adams
City: Topeka
State: KS

School Information
SCHOOL INFORMATION

Zip Code: 66609

124
CONTACT INFORMATION

Title:
First Name: Vickie
First Name: Broxterman
Work Phone:                    Home Phone:
Email Address:
Alt Email Address:

Save

\*\*School information on this Yearbook Avenue Page is updated nightly.\*\*
\*\*Contact information is always current.\*\*

FIG. 9

HOME - CALENDAR jostens™ Yearbook Avenue™

Topeka 9 Y Job: 60127
Welcome Yearbook Adviser 21-JUL-04
138 Sign Out   Edit Personal Login   Search

Project Calendar: Weekly View

⊙ WEEKLY VIEW   ⊙ RECENTLY ADDED   ⊙ MONTHLY SUMMARY

For the week of 7/18/2004 to 7/24/2004

Sunday July 18                                              ⊕ ADD NOTE
140 — finish year book                              ⊜ EDIT ⊜ DELETE
142 — NOTES finish year book                                     ⊜ EDIT ⊜ DELETE
NOTES Monday July 19                                              ⊕ ADD NOTE Tuesday July 20                                             ⊕ ADD NOTE Wednesday July 21                                           ⊕ ADD NOTE Thursday July 22                                            ⊕ ADD NOTE Friday July 23                                              ⊕ ADD NOTE June 2004
S  M  T  W  T  F  S
30 31 1  2  3  4  5
6  7  8  9  10 11 12
13 14 15 16 17 18 19
20 21 22 23 24 25 26
27 28 29 30 1  2  3
       ▲
July 2004
S  M  T  W  T  F  S
      ▼
27 28 29 30 1  2  3
4  5  6  7  8  9  10
11 12 13 14 15 16 17
18 19 20 21 22 23 24
25 26 27 28 29 30 31

August 2004
S  M  T  W  T  F  S
1  2  3  4  5  6  7
8  9  10 11 12 13 14
15 16 17 18 19 20 21
22 23 24 25 26 27 28
29 30 31 1  2  3  4

Select month and year:
[Jul ▶] [2004 ▶]

FIG. 11

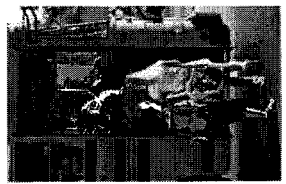
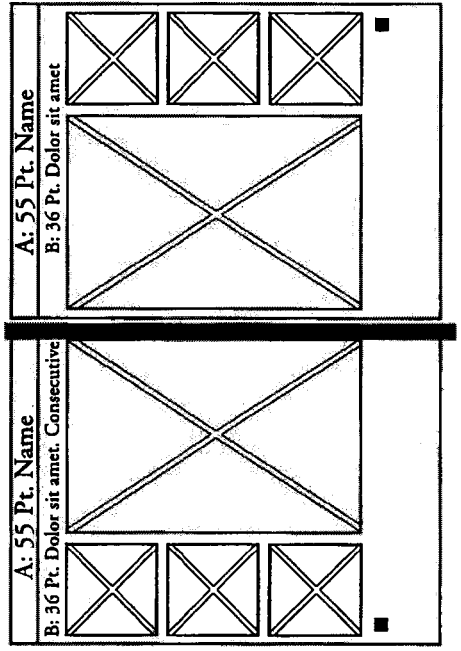
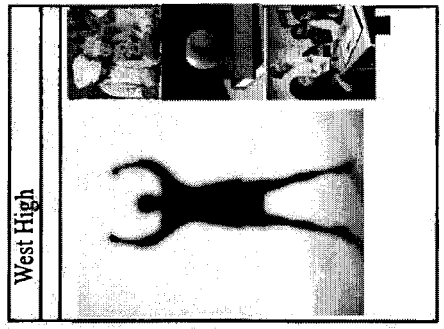
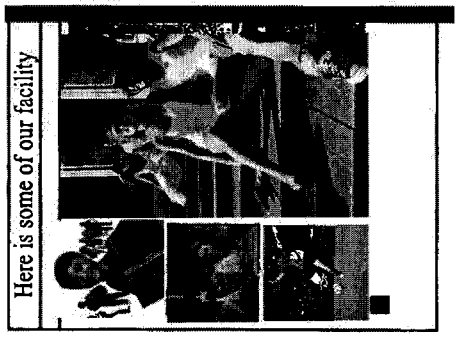
FIG. 12

FIG. 14

School Name

Grad. Year

Logo

FIG. 19

CREATE - PAGE SUBMISSIONS jostens Yearbook Avenue™

Topeka 9 Y Job: 60127
Welcome Yearbook Adviser 21-JUL-04
Sign Out  Edit Personal Login  Search Page Submission Information — 230

PAGE/PHOTO SUBMISSION DEADLINES — 232

| Deadline | Staff Date | Deadline Date | Pages Required | Photos Required | Photos Needed | Pages Assigned in Ladder | Deadline Completed |
|---|---|---|---|---|---|---|---|
| Total | | | 288 | 1440 | 1216 | 0 | |

You can optionally enter staff deadlines in one or more of the areas above if you want your staff to see different deadline dates. Staff and Editor users will see the original Date Due or the Staff Date if entered (not both).

[ Update Staff Deadlines ] — 234

PAGE SUBMISSIONS RECEIVED

Pages Received    Date Received
No pages received

PAGE SUBMISSIONS TOTALS — 236

Total Pages Received    Total Pages Needed
0                        N/A                  — 238

YOUR LATEST PAGE SUBMISSION MESSAGE

Message    Date
No message Available

Information on this Yearbook Avenue Page is updated nightly

FIG. 23

CREATE - COVER INFO.

jostens Yearbook Avenue™

Topeka 9 Y Job: 60127

Welcome Yearbook Adviser 21-JUL-04

Sign Out   Edit Personal Login   Search

← 238

Cover Information   240

YOUR YEARBOOK COVER INFORMATION

Kind of Cover      True Life Color
Trim Size          9 X 12      242

YOUR ENDSHEET INFORMATION

| | |
|---|---|
| Front Paper | None |
| Front color 1 | None |
| Front color 2 | None |
| Back Paper | None |
| Back color 1 | None |
| Back color 2 | None |
| Special Design Used? | No |
| Front and back endsheets the same? | None |
| Endsheet has printing on pages | No |
| Endsheet being proofed? | None |
| Date proof sent | None |
| Date proof returned | None |

Information on this Yearbook Avenue Page is updated nightly

FIG. 24

CREATE - MESSAGES jostens Yearbook Avenue™

Topeka 9 Y Job: 60127

Welcome Yearbook Adviser 21-JUL-04

Sign Out  Edit Personal Login  Search

Page Submission Information ← 246

YOUR PAGE SUBMISSION MESSAGES

Message                                    Date

No messages available

Information on this Yearbook Avenue Page is updated nightly

FIG. 25

CREATE - COMPLETE PAGE GRID jostens™ Yearbook Avenue™

Topeka 9 Y Job: 60127

Welcome Yearbook Adviser 21-JUL-04

Sign Out   Edit Personal Login   Search

Cover Information   248

YOUR COMPLETE PAGE GRID

Page Grid        Multiples        Sigs

Color Status Code Legend

[PC] Process Color Specified   [SC] Second Color Specified   [CI] Color Indicated (initial production flag)

If a date appears beneath a page number, this indicates that the page has been received.

Please note that "Missing" (in red) indicates pages needed to complete a color multiple.

Color pages will now show as color until they clear the color markup area in the yearbook plant. Depending on production loads, there could be a delay in recording this information

Information on this Yearbook Avenue Page is updated nightly

Topeka 9 Y
Job Number: 60127
Report Date: 7/21/2004

252

YOUR CURRENT BOOK STATISTICS
| Number of Pages | 288 |
|---|---|
| Book Size | 8 x 12 |
| Copies Planned | 475 |

254

YEARBOOK OPTIONS YOU'VE ORDERED
| No Options Found |
|---|

256

YOUR CURRENT BOOK STATISTICS
| Kind of Cover | True Life Color |
|---|---|
| Trim Size | 9 x 12 |

258

YOUR CURRENT BOOK STATISTICS
| Front Paper | None |
|---|---|
| Front color 1 | None |
| Front color 2 | None |
| Back Paper | None |
| Back color 1 | None |
| Back color 2 | None |
| Special Design Used? | None |
| Front and back endsheets the same? | No |
| Endsheet has printing on pages | None |
| Endsheet being proofed? | No |
| Date proof sent | None |
| Date proof returned | None |

260

PAGE / PHOTO SUBMISSION DEADLINES
| Deadline | Deadline Date | Pages Required | Photos Required | Photos Needed | Pages Assigned in Ladder | Deadline Completed |
|---|---|---|---|---|---|---|
| Total | | 288 | 1440 | 1218 | 0 | |

262

PAGE SUBMISSION RECEIVED
| Pages Received | Date Received |
|---|---|
| No pages received | |

264

PAGE SUBMISSIONS TOTALS
| Total Pages Received | Total Pages Needed |
|---|---|
| 0 | N/A |

266

YOUR KEY DATES
| Contract Ship Date | 07-MAY-05 |
|---|---|

268

SCHEDULED DEPOSITS
| Deposit | Deposit Due | Date Due | Balance Due | Status |
|---|---|---|---|---|

270

PAYMENTS RECEIVED
| Date Received | Amount Received |
|---|---|

272

YOUR LATEST PAGE SUBMISSION MESSAGE
| Message | Date |
|---|---|
| No messages Available | |

274

YOUR COMPLETE PAGE GRID
| Page Grid | Multiples | Sigs |
|---|---|---|

Color Status Code Legend

PC Process Color Specified    SC Second Color Specified    CI Color Indicated (initial production flag)

YOUR COMPLETE PROOF GRID

| Page Grid | | | | | | | | | | | | | | | | Multiples | | Sigs |
|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 1 | 2 | 1 |
| 17 | 18 | 19 | 20 | 21 | 22 | 23 | 24 | 25 | 26 | 27 | 28 | 29 | 30 | 31 | 32 | 3 | 4 | 2 |
| 33 | 34 | 35 | 36 | 37 | 38 | 39 | 40 | 41 | 42 | 43 | 44 | 45 | 46 | 47 | 48 | 5 | 6 | 3 |
| 49 | 50 | 51 | 52 | 53 | 54 | 55 | 56 | 57 | 58 | 59 | 60 | 61 | 62 | 63 | 64 | 7 | 8 | 4 |
| 65 | 66 | 67 | 68 | 69 | 70 | 71 | 72 | 73 | 74 | 75 | 76 | 77 | 78 | 79 | 80 | 9 | 10 | 5 |
| 81 | 82 | 83 | 84 | 85 | 86 | 87 | 88 | 89 | 90 | 90 | 92 | 93 | 94 | 95 | 96 | 11 | 12 | 6 |
| 97 | 98 | 99 | 100 | 101 | 102 | 103 | 104 | 105 | 106 | 107 | 108 | 109 | 110 | 111 | 112 | 13 | 14 | 7 |
| 113 | 114 | 115 | 116 | 117 | 118 | 119 | 120 | 121 | 122 | 123 | 124 | 125 | 126 | 127 | 128 | 15 | 16 | 8 |
| 129 | 130 | 131 | 132 | 133 | 134 | 135 | 136 | 137 | 138 | 139 | 140 | 141 | 142 | 143 | 144 | 17 | 18 | 9 |
| 145 | 146 | 147 | 148 | 149 | 150 | 151 | 152 | 153 | 154 | 155 | 156 | 157 | 158 | 159 | 160 | 19 | 20 | 10 |
| 161 | 162 | 163 | 164 | 165 | 166 | 167 | 168 | 169 | 170 | 171 | 172 | 173 | 174 | 175 | 176 | 21 | 22 | 11 |
| 177 | 178 | 179 | 180 | 181 | 182 | 183 | 184 | 185 | 186 | 187 | 188 | 189 | 190 | 191 | 192 | 23 | 24 | 12 |
| 193 | 194 | 195 | 196 | 197 | 198 | 199 | 200 | 201 | 202 | 203 | 204 | 205 | 206 | 207 | 208 | 25 | 26 | 13 |
| 209 | 210 | 211 | 212 | 213 | 214 | 215 | 216 | 217 | 218 | 219 | 220 | 221 | 222 | 223 | 224 | 27 | 28 | 14 |
| 225 | 226 | 227 | 228 | 229 | 230 | 231 | 232 | 233 | 234 | 235 | 236 | 237 | 238 | 239 | 240 | 29 | 30 | 15 |
| 241 | 242 | 243 | 244 | 245 | 246 | 247 | 248 | 249 | 250 | 251 | 252 | 253 | 254 | 255 | 256 | 31 | 32 | 16 |
| 257 | 258 | 259 | 260 | 261 | 262 | 263 | 264 | 265 | 266 | 267 | 268 | 269 | 270 | 271 | 272 | 33 | 34 | 17 |
| 273 | 274 | 275 | 276 | 277 | 278 | 279 | 280 | 281 | 282 | 283 | 284 | 285 | 286 | 287 | 288 | 35 | 36 | 18 |

Home Ordering Made Easy (HOME) Program

Professional Marketing for Any Budget

Promote your yearbook with a colorful flyer you can create right in your own yearbook room. Home Ordering Made Easy (HOME) is a Jostens sales tool for schools that want to reach parents at home to involve them in the purchase decision. The program allows you to:

- Design an affordable, professional, customized yearbook sales flyer online
- Create a sales flyer, order form, and collection envelope in one, so it's easier than ever for parents to order and you to collect payments
- Accept and process credit card orders through a school-specific location on the jostens.com Web site

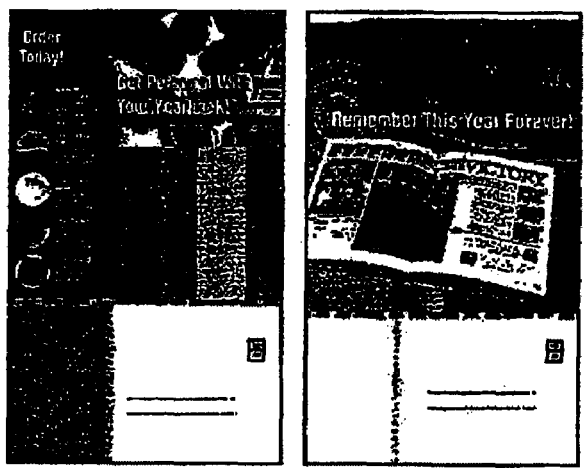

HOME makes it easy for you to market and sell your yearbook. And by involving parents in the yearbook buying decision you can increase your yearbook and yearbook add-on sales.

Speak with your yearbook representative to find out how simple it is to create a professional flyer with your unique yearbook sales offering including:

- A four-color flyer promoting your yearbook sale
- Flexibility to determine the pricing offer, and message that meets your needs
- Easy-to-determine reporting for all Web transactions Put the HOME program to work for you and create a customized yearbook offer to send to all your students and their parents. While you manage the selling process from start to finish, this tool will allow you to benefit from the influence that parents have in the buying decision.

Contact your Jostens Yearbook Representative today to get started creating your school's yearbook flyer.

FIG. 28

SELL - HOME WEB SALES
280 jostens Yearbook Avenue™

Topeka 9 Y Job: 60127

Welcome Yearbook Adviser 21-JUL-04

Sign Out   Edit Personal Login   Search

HOME Sales Results

This page shows the sales results to date for any credit card purchases made on-line for your flyers.

Please note, the button to download your web sales to ItPays will not be active until after your first flyer's web order deadline has passed. If you have multiple flyers, subsequent flyers will have the student orders added to the download as their web order deadlines have passed.

[ Download Now ]

To request a refund for an order places via jostens.com, please click on the student details link.

Total Sales Results - All Flyers

| Product Sales | Sales Tax | Total $ |
|---|---|---|
| $0.00 | $0.00 | $0.00 |

Number of orders
0

This Yearbook Avenue Information updated nightly

FIG. 29

SYSTEM AND METHOD FOR YEARBOOK CREATION

FIELD OF THE INVENTION

This invention relates generally to a system and method for creating yearbooks, and more specifically to an online system and method for creating yearbooks.

BACKGROUND OF THE INVENTION

Yearbooks are currently developed using traditional desktop publishing applications such as PageMaker, Quark and InDesign. Traditional creation includes using paste-ups in a process that is typically very time-consuming.

BRIEF SUMMARY OF THE INVENTION

The present invention relates to a system and method for creating yearbooks. The yearbook system provides a single, extensive resource to plan, create, educate about, sell, and distribute yearbooks. The system further provides an integrated yearbook system management and yearbook production system to enable the production of the yearbook to a printed output.

The yearbook system comprises a user component and a production component. The user component is used by the user to design and create the yearbook. The user component may include user-specific content and informational content. The production component is used to covert the created yearbook into a printed output. The user component and the production component interact such that submissions are made to the production component via the user component and the production component can communicate with the user component regarding the submissions. Users may interact with the yearbook system via a standard internet connection.

The method for creating a yearbook comprises user planning of the yearbook, user development of the yearbook and user submission of completed portions of the yearbook. The method further comprises production review of the submitted portions of the yearbook, production communication to a user regarding the submission portions of the yearbook and production conversion of the submitted portions of the yearbook into a printed output.

While multiple embodiments are disclosed, still other embodiments of the present teachings will become apparent to those skilled in the art from the following detailed description, which shows and described illustrative embodiments. As will be realized, the teachings are capable of modifications in various obvious aspects, all without departing from the spirit and scope of the present teachings. Accordingly, the drawings and detailed description are to be regarded as illustrative in nature and not restrictive.

BRIEF DESCRIPTION OF THE DRAWINGS

FIG. 5 illustrates a fonts page in accordance with one embodiment of the present invention.

FIG. 6 illustrates a styles page in accordance with one embodiment of the present invention.

FIG. 7 illustrates a photo submission website page in accordance with one embodiment of the present invention.

FIG. 8 illustrates a yearbook staff maintenance screen in accordance with one embodiment of the present invention.

FIG. 9 illustrates a school information page in accordance with one embodiment of the present invention.

FIG. 11 illustrates a yearbook system calendar page in accordance with one embodiment of the present invention.

FIG. 12 illustrates a virtual book of a yearbook being created with a yearbook system in accordance with one embodiment of the present invention.

FIG. 14 illustrates a printable ladder in accordance with one embodiment of the present invention.

FIG. 19 illustrates a cover template in accordance with one embodiment of the present invention.

FIG. 23 illustrates a photo submissions information page in accordance with one embodiment of the present invention.

FIG. 24 illustrates a cover information page in accordance with one embodiment of the present invention.

FIG. 25 illustrates a messages page in accordance with one embodiment of the present invention.

FIG. 26 illustrates a page status grid in accordance with one embodiment of the present invention.

FIG. 27 illustrates a summary report in accordance with one embodiment of the present invention.

FIG. 28 illustrates a HOME flyer page in accordance with one embodiment of the present invention.

FIG. 29 illustrates a HOME web sales page in accordance with one embodiment of the present invention.

DETAILED DESCRIPTION OF THE INVENTION

The present invention relates to a yearbook system to plan, create, educate about, sell, and distribute yearbooks. The yearbook system provides a single extensive resource for schools to design, create, sell and distribute yearbooks. The system further provides an integrated yearbook system management and yearbook production system to enable the production of the yearbook to a printed output.

Of course, in addition to creating yearbooks such as those typically distributed in high schools and some middle schools, the present invention may be used to create memory books such as those distributed at elementary schools and small middle schools or other books. Yearbooks generally are hard cover, have 50 to several hundred pages (page range may vary), include endsheets and tip-ins], and may be produced in color or in black and white. Memory books generally are soft cover, have 8-64 pages (page range may vary), and may be produced in color or in black and white. Thus, while the present invention is generally described in terms of yearbooks, the invention is equally suited for other books.

Figure 1:
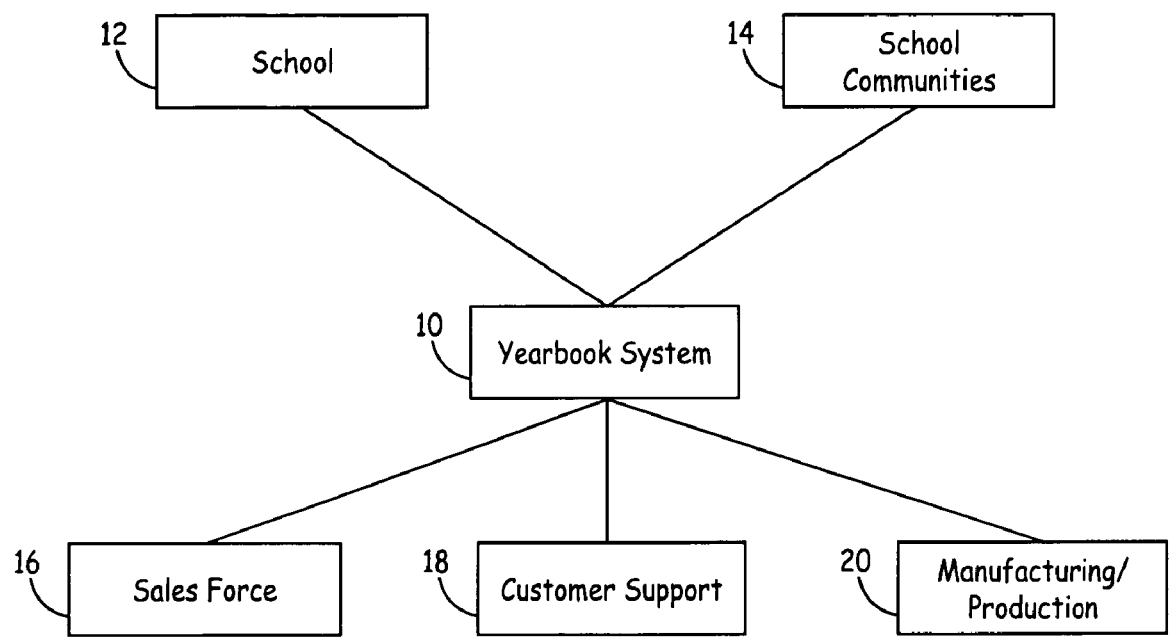
FIG. 1 illustrates interaction of a yearbook system in accordance with one embodiment of the present invention.

As shown in FIG. 1, the system 10 interacts with schools 12, school communities 14, a sales force 16, customer support 18, and manufacturing 20. Schools 12 may interact with the system 10 while designing a yearbook using a desk top publishing application or an online creation tool. Schools 12 and school communities 14 can interact with the system 10 using any standard internet connection; special software is not required. Unless specified otherwise, the description of the system 10 is intended to encompass schools using a desk top publishing application as well as schools using an online creation tool.

School Use of the Yearbook System

Figure 2:
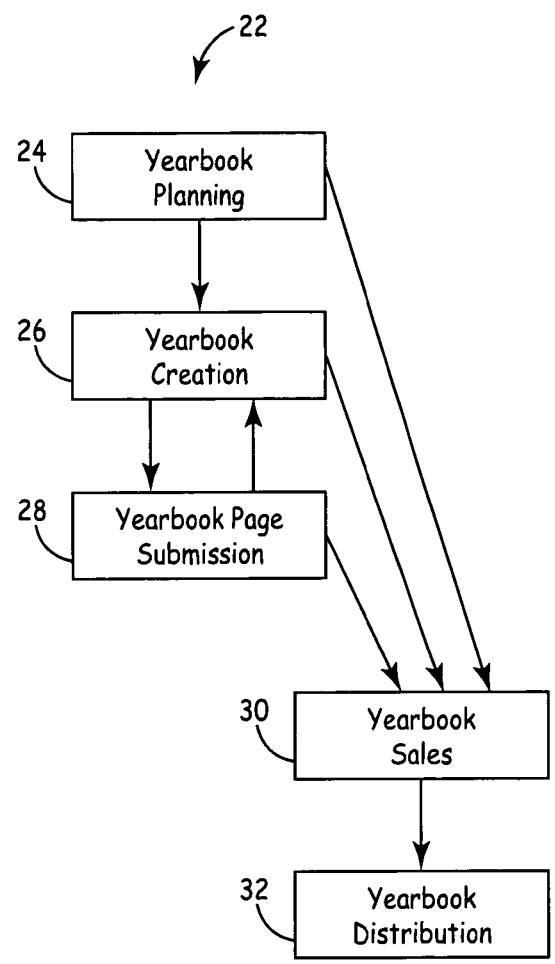
FIG. 2 illustrates a flowchart of the user side of a yearbook process in accordance with one embodiment of the present invention.

The yearbook system of the present invention provides a tool for use from the start to the finish of the yearbook process. Thus, the yearbook system, in addition to use in creating a yearbook, may be used for managing staff, educating staff regarding the yearbook process, merchandising, selling, and distributing the yearbook. FIG. 2 illustrates a process flow 22 of a school using the yearbook system during the yearbook process. Prior to creating the yearbook, yearbook staff plan each portion of the yearbook 24—including cover, portrait pages, and activity pages. Planning may be accomplished by determining the sections to be included in the yearbook, determining what pages are to be devoted to which sections, choosing a template for each page, and assigning a staff member to each page. These planning selections may be incorporated into an easy-to-use planning ladder, described more fully below in relation to FIG. 4. During creation of the yearbook 26, staff members develop each page laid out during the planning stage. Creation may involved customizing the template used, adding text, photos, clipart, or colors. Once the page is complete, the page may be submitted for production 28. Submissions may be done by individual page or in a grouping of pages. If the page was created using a desktop publishing application, a printed page from a production facility may be returned to the staff for proofing. The yearbook staff is also frequently responsible for the selling of the yearbooks 30. The yearbook staff may use the present invention to design merchandising materials and track sales of the yearbook. After the yearbook has been sold and printed, the present invention may be used for aid in the distribution of the yearbooks 32.

Figure 3:
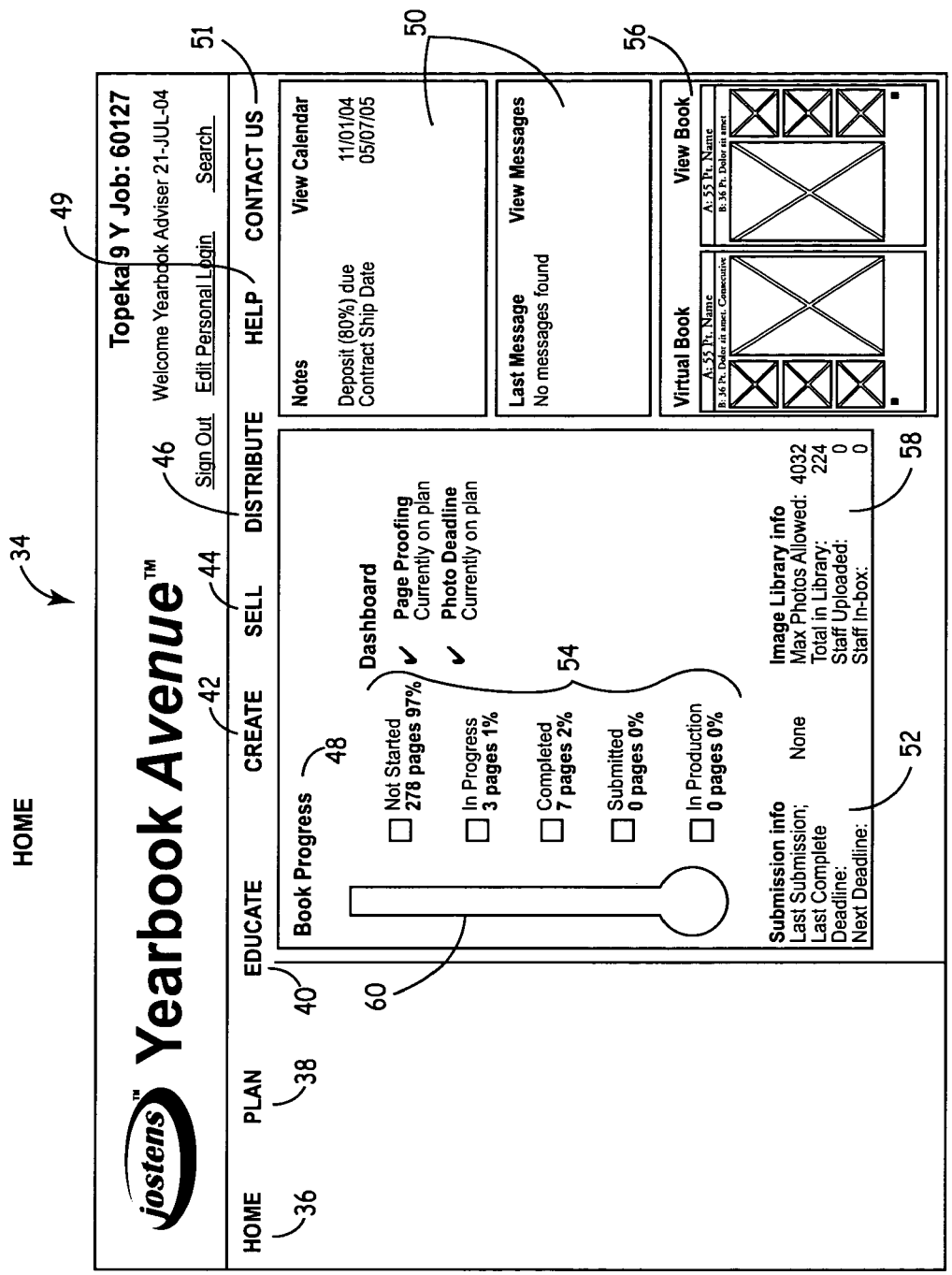
FIG. 3 illustrates a yearbook system home page in accordance with one embodiment of the present invention.

FIG. 3 illustrates a yearbook system home page 34 in accordance with one embodiment of the present invention. Users of the system can access the yearbook system home page 34 via a standard internet connection. As shown, the yearbook system has navigational features to each of Home 36, Plan 38, Create 42, Educate 40, Sell 44, and Distribute 46. Other navigational features may be included to Supplies, Help, and Contact Us. Two types of information are provided within each of these categories: information specific to the school and informational content. Some of the informational content available is dynamic content that may be frequently changed or updated. That information tends to be important for the type of information provided while the specifics of the information being less important.

The system home page 34 shown in FIG. 3 may be customized for each school using the yearbook system. Generally, the system home page provides a summary of the information specific to the school that may be otherwise accessed through the Home 36, Plan 38, Create 42, Educate 40, and Sell 44 tabs. The home page 34 provides a snapshot view of the yearbook progress 48, notes and messages 50 regarding the yearbook, deadline status 52, submission information 54 and a virtual book access 56. Further, the system home page 34 may include Image Library Information 58 regarding photos submitted by the school such as the maximum number of photos allowed, the number of photos currently in the library, the number of photos uploaded by the staff, and the number of photos currently in the staff in-box (prior to placement in the library).

A progress bar 60 may be provided on the yearbook system home page 34 for giving a visual illustration of the progress of the yearbook creation. As shown, the progress bar 60 illustrates the number and percentage of pages not yet started, the number and percentage of pages currently in progress, the number and percentage of pages completed, the number and percentage of pages submitted, and the number and percentage of pages in production. Thus, a school may easily visually track their progress in creating the yearbook.

The yearbook creation summary page 34 may further provide a link to a Virtual book 56. Virtual books are described more fully in relation to FIG. 12. Briefly, the virtual book provides a flip-through virtual book of all pages not started, currently in progress, completed, submitted, or in production.

As stated above, the yearbook system provides a tool for use from the start to the finish of the yearbook process. The yearbook system may be used for educating yearbook staff regarding the yearbook process, for planning the yearbook, for creating the yearbook, for selling the yearbook (including merchandising), and for distributing the yearbook. Each of these categories are discussed below. Some of these categories are discussed in relation to example web pages associated with the category. The web pages shown are illustrative of pages that may be used in a yearbook system in accordance with the present invention. However, each page, or a similar page, need not be used. Further, obvious variations may be obvious to one skilled in the art and are intended to be included within the scope of the present invention.

Educate

The yearbook system home page 34 provides an Educate tab 40 for accessing Educate information. The Educate information includes information useful for a staff advisor to educate yearbook staff regarding the year book process and is generally informational content. Generally, the Educate information is dynamic content that may be changed or updated with some frequency. The Educate information may include publication information and classroom tools. Publication information may include recommended magazines and books devoted to the yearbook process. Classroom Tools may include teaching plans, teaching examples, and other tools useful for a staff advisor for teaching the yearbook process in a classroom setting.

Plan

The yearbook system home page 34 provides a Plan tab 38 for accessing Plan Information. The Plan information includes information and tools useful for yearbook staff to plan the yearbook. Generally, the Plan information includes both school specific information and informational content. The informational content is typically dynamic.

Example informational content provided within the Plan information are cover, theme, and segment ideas. Such ideas may provide examples of covers used, themes developed, and segments created in other yearbooks. These examples are not generally intended for outright copying but are instead intended to provide guidance to yearbook staff in creating their own cover, themes, and segments to customize their yearbook.

School specific information provided within the Plan information include a planning ladder, fonts, styles, community photo site, staff management, school information, book configuration and key dates, and payment information.

Figure 4:
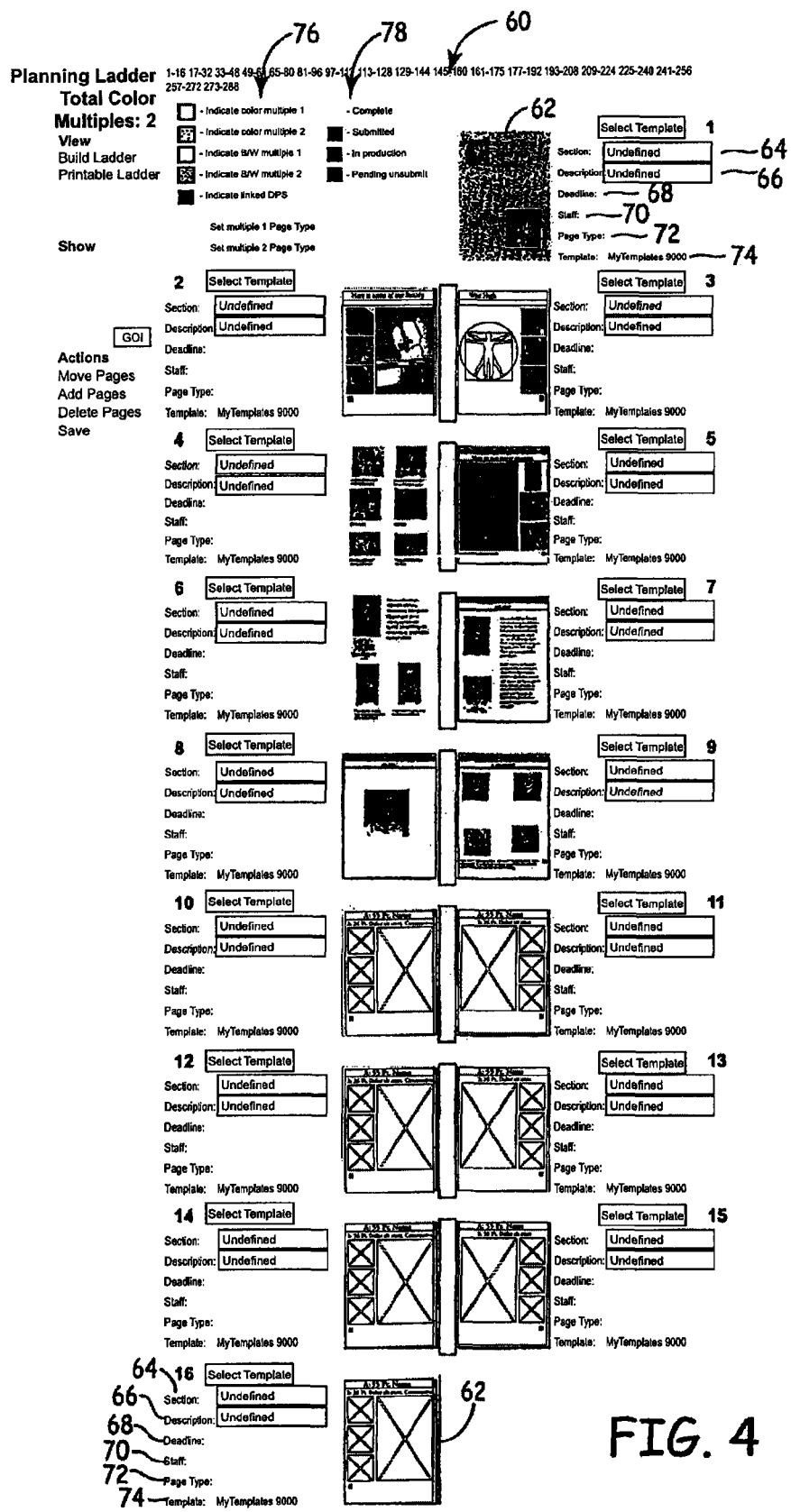
FIG. 4 illustrates a planning ladder in accordance with one embodiment of the present invention.

FIG. 4 illustrates a Planning Ladder 60 in accordance with the present invention. The Planning Ladder 60 may be used to lay out the groundwork for creating the yearbook. The Planning Ladder 60 provides a thumbnail image 62 of each page (whether complete, partially created or still in template form). At the beginning of the planning stage, of course, the furthest each page may be is in template form. Associated with each thumbnail page image may the following information: section 64, description 66, deadline 68, staff 70, page type 72, template 74.

Thus, during planning, the yearbook staff may determine what section 64 of the yearbook the page will be in. Further, the planning ladder 60 visually indicates to the staff how many pages are allotted to each section. Similarly, the yearbook staff may assign a description 66 to the page within the section. Thus, for example, a section may be Fall Sports and a description of a page may be Girls Cross Country. The section 64 and description 66 are entered by the staff. Each page may be given a template 74 for creating the page. In some embodiments, the exact template chosen may not be shown in the planning ladder—for example, a customized template designed using a desktop publishing application may not be scanned in and placed into the planning ladder. Alternately, however, such scanning and placement may be done.

A deadline 68 may be assigned to the page for when the page is to be submitted. Generally, the pages are set into signatures, for example a new signature starts every sixteen pages. Each signature may have an associated deadline. Thus, the deadline 68 associated with the page may be that of the signature of which the page is a part. Staff information 70 may be entered such as the staff member or members currently designated for creating and editing the page. Thus, the Planning Ladder 68 permits visual identification of the pages assigned to each staff member and the deadlines of the pages assigned to each staff member.

Page type 70 indicates whether the page is color or black and white. Generally, a signature (or a multiple—half of a signature) is assigned as color or black and white. Within a color signature, an individual page may be designated as black and white. Color coding 76 may be used to indicate to what multiple the page belongs and whether that multiple is color or black and white. Typically, signatures are printed on the front and back of a single large piece of paper, with the paper then being cut and folded in a manner to create 16 consecutive pages. The pages printed on the front of the single large piece of paper are designated Multiple 1, the pages printed on the back of the single large piece of paper are designated Multiple 2. It may be useful to track to which multiple each page belongs so that, if 7 of 8 pages of Multiple 1 are submitted, the single non-submitted page is priority flagged to be completed and submitted. Color coding may also be used to indicate whether the page is part of a double page spread (DPS). DPS pages are linked together such that one cannot be moved without the other being moved. Typically, DPS pages arise when a photo crosses more than one page.

For easy reference during the creation process, color coding 78 may be used to indicate whether the page is complete, submitted, in production, or pending unsubmit. Within the Planning Ladder, pages may be moved, added, or deleted. The Planning Ladder sets the basis for the Build Ladder, described in relation to FIG. 18.

Figure 5:
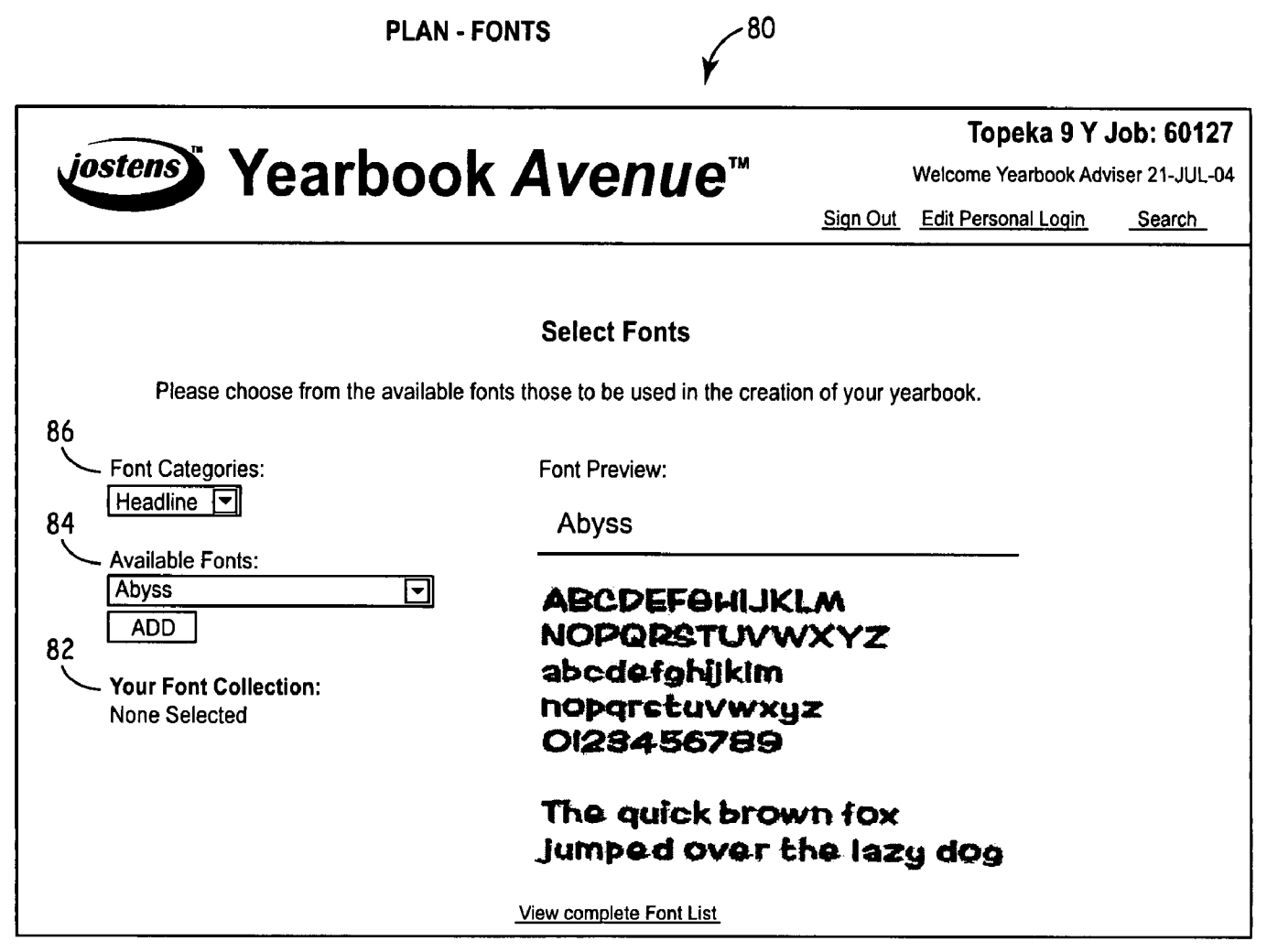

FIG. 5 illustrates a Fonts page 80 where the fonts for use in the creation of the yearbook may be selected. A font collection 82 is created on the fonts page listing what fonts 84 are used with what category 86. For example, it may be desirable for only one selected font to be used in headline category items. The font collection then lists what font may be used for headline category items. The font collection thus aids in providing consistency throughout the yearbook and limits the selection of fonts available.

Figure 6:
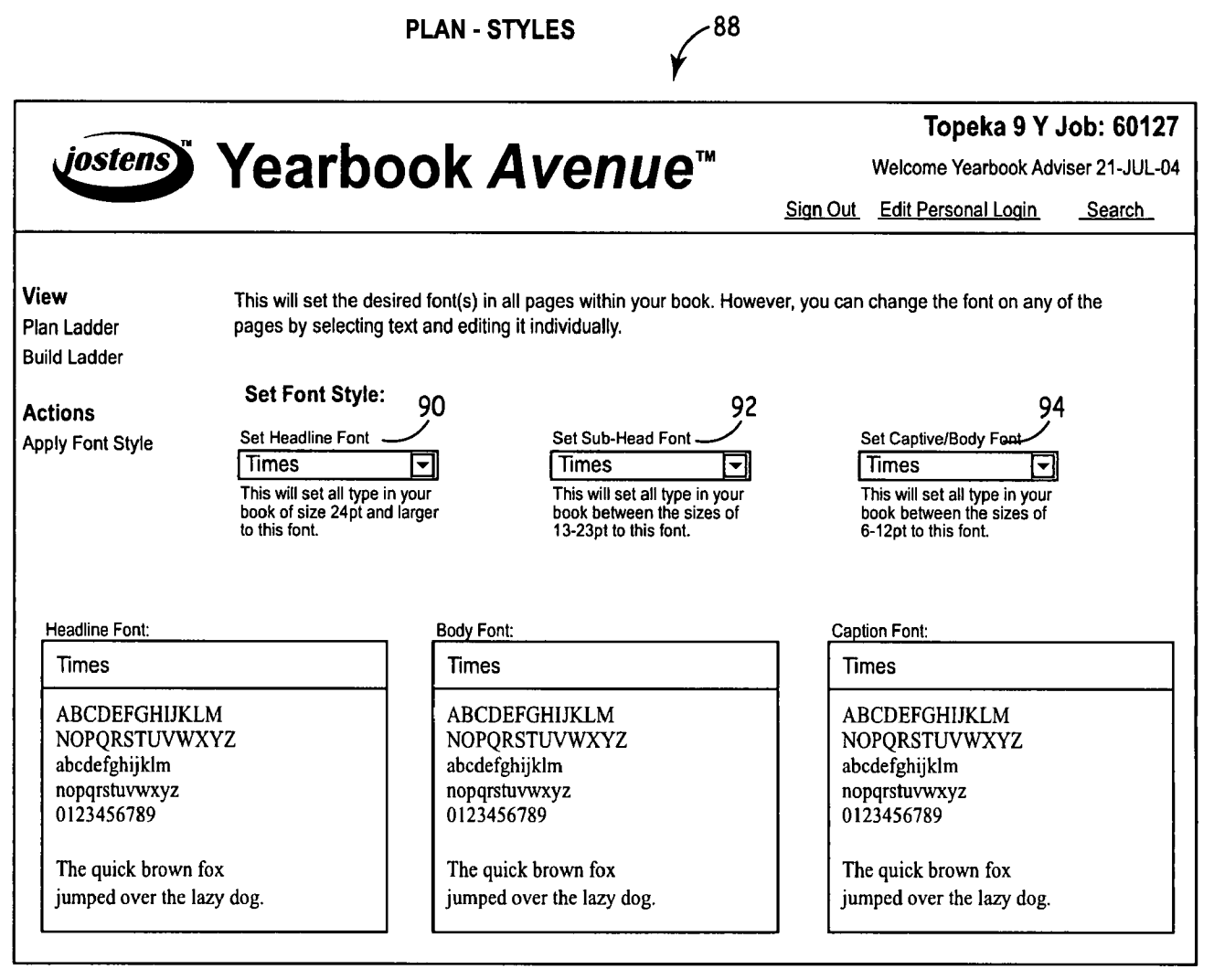

FIG. 6 illustrates a Styles page 88. The styles page 88 is used to set the desired font in all pages within the book. A default font may be set for the headline 90, sub-head 92, and caption or body categories 94 throughout the book. The categories are determined based on the pt size of the font used. Thus, for example, all fonts of 24 pt or larger are determined as headlines, all fonts of 13-23 pt are determined as sub-head, and all fonts of 6-12 pt are determined as caption/body. Regardless of style setting, the font selection may be changed on any of the pages by selecting the text and editing it individually. Generally, the changed font is compliant with the font collection of the Fonts page, shown in FIG. 5.

FIG. 7 illustrates a Photo Submission Web Site 96. Schools may enable a photo submission web site 96 to permit others to submit photos for incorporation in the yearbook. For example, parents and other may upload photos to the site for the yearbook's staff to use. To enable such a site, the following information is entered: a start date 98 for availability of the site, an end date 100 for the site, a user id 102 for the site, a password 104 for the site, and a maximum number of images 106 that may be submitted. A location for the website (a web address) 108 is then assigned. Users, such as parents or other school community members, may access the website 108 via a standard internet connection. Through the Yearbook Creation Home Page 34, staff may view how many images have been submitted. In one embodiment, the uploaded photos are placed on a quarantined site for viewing by the staff advisor to decide whether the photo is to be used. Once selected for use, the photo may be transferred to the Image Library.

FIG. 8 illustrates a Yearbook Staff maintenance screen 110. The screen 110 provides the ability to add new members to the yearbook staff by providing a name 112 and, optionally, and e-mail address 114. Further, the screen lists all current yearbook staff 116. The current staff may be updated or deleted. Members of the yearbook staff are given access to the yearbook system. Some areas of the yearbook system web site may only be accessed by a set level of staff. For example, only the staff advisor may be given access to the Educate Information. Further, the information available in the dynamic content areas of the site may depend on the staff level. Similarly, the actions available may depend on the staff level. For example, only the staff advisor may be permitted to submit a page for production. Staff entered into the Yearbook Staff maintenance screen 110 may be designated as responsible staff members for pages in the Planning Ladder 60. Further, it may be possible to track what pages each staff member is responsible for by searching the staff member name.

FIG. 9 illustrates school information 118 accessed through the Plan information. The school information 118 includes the school name 120 and address 122 as well as contact information 124. A contact person is listed on the school information and includes the title, name, work phone, home phone, and email address of the contact person. Typically, this contact person is associated with the school, such as the yearbook advisor. This information may be used for correspondence between production and the school.

Figure 10:
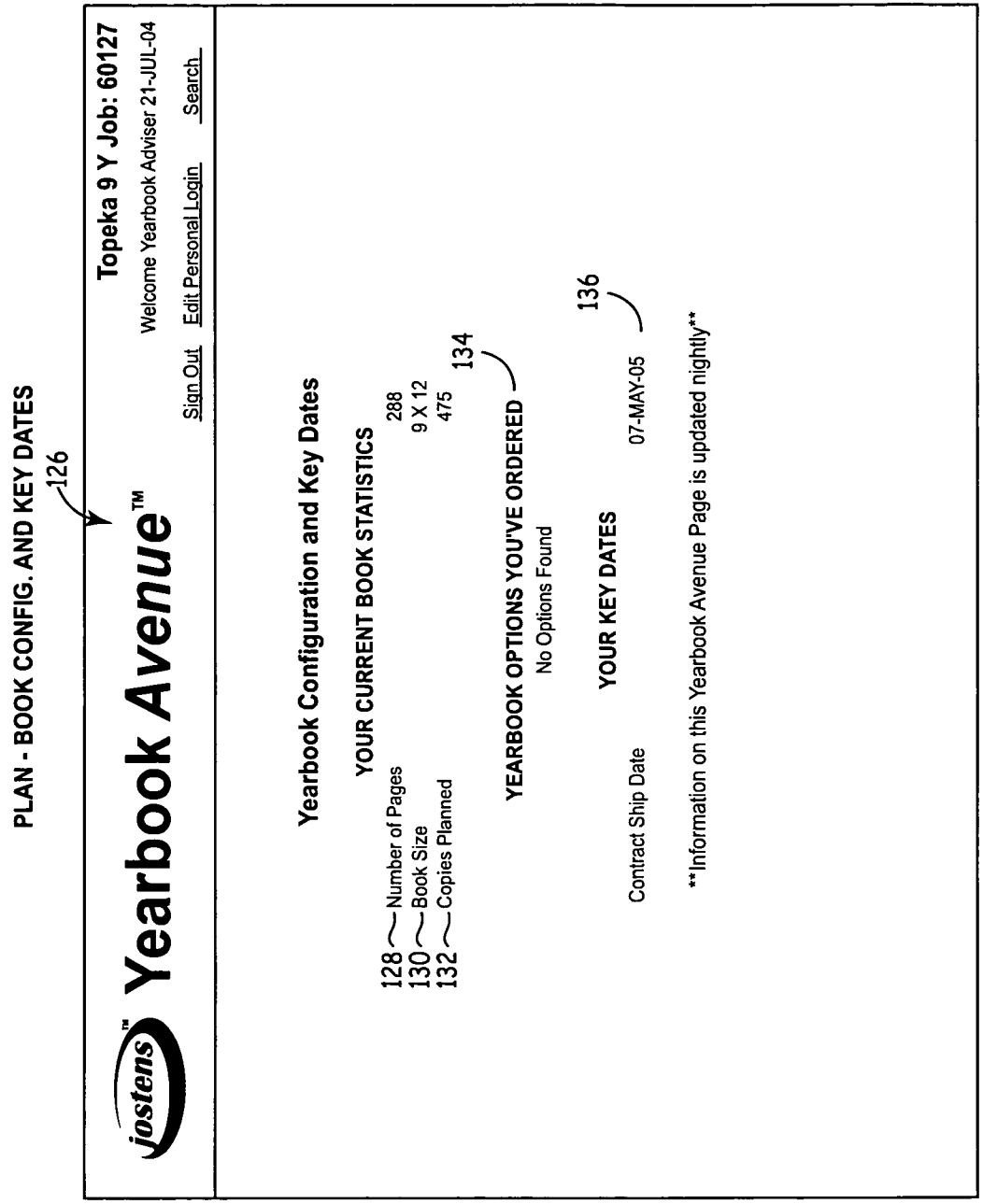
FIG. 10 illustrates a yearbook configuration information and key dates page in accordance with one embodiment of the present invention.

FIG. 10 illustrates a yearbook configuration information and key dates page 126. The yearbook configuration information includes the number of pages 128 planned for the yearbook, the book size 130, and the number of copies 132 planned for production. The yearbook configuration information and key dates page 126 may further list yearbook options ordered 134. The key dates 136 may include, for example, the contract ship date. For planning purposes, deadline dates and submission dates may be assigned backwards from the ship date.

FIG. 11 illustrates a Project Calendar 138. The project calendar 138 may be viewed in a weekly view. An action item 140 and associated notes 142 may be entered under each date.

FIG. 12 illustrates a Virtual Yearbook 144 discussed in relation to the yearbook system home page 34. The virtual book 144 may be accessed via the virtual yearbook 56 section on the yearbook system home page 34, from the planning ladder 60 of FIG. 4 or from the build ladder 146 of FIG. 13, discussed later. The virtual book provides a flip-through virtual book of all pages not started, currently in progress, completed, submitted, or in production. The Virtual Yearbook may not be available in all embodiments.

Create

The yearbook system home page 34 provides a Create tab 42 for accessing Create information. The Create information includes information and tools useful for yearbook staff to create the yearbook. Generally, the Create information includes both school specific information and informational content. The informational content is typically dynamic.

Example informational content provided within the Create information are creation tools. Such tools may provide examples of the process of yearbook planning and creation.

School specific information provided within the Create information include a build ladder, a template builder, panel pages, an image library, photo coverage, an index, cover information, page submissions, messages, a complete page grid, and a summary report.

Figure 13:
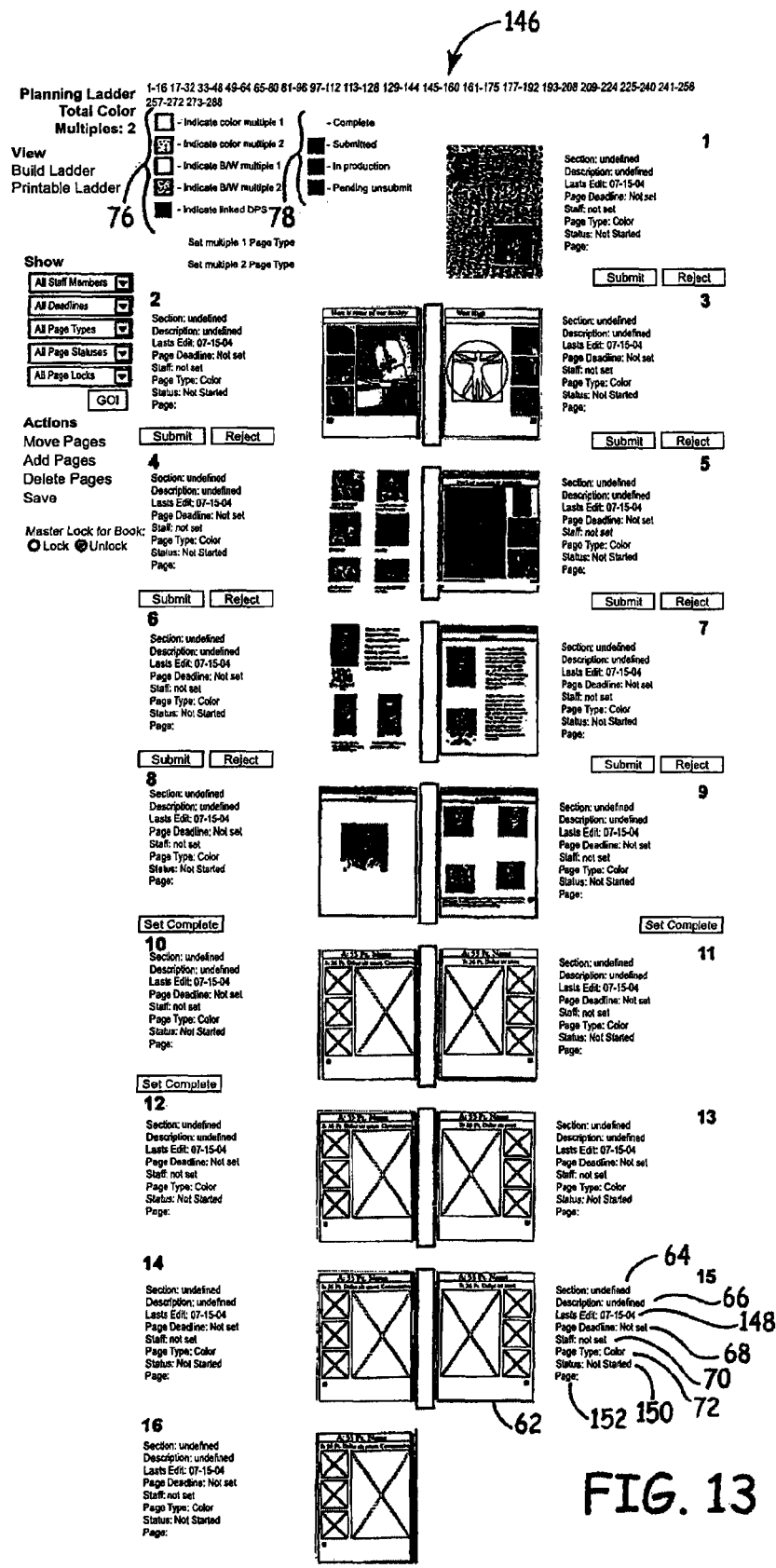
FIG. 13 illustrates a build ladder in accordance with one embodiment of the present invention.

FIG. 13 illustrates a Build Ladder 146 in accordance with one embodiment of the invention. The basis for the Build Ladder 146 is set in the Planning Ladder 60 (discussed previously in relation to FIG. 4). Like the Planning Ladder 60, the Build Ladder 146 provides a thumbnail image 62 of each page (whether complete, partially created or still in template form). Associated with each thumbnail page image is the following information: section 64, description 66, last edit 148, page deadline 68, staff 70, page type 72, status 150 and page 152. The section 64, description 66, page deadline 68, staff 70, and page type 72 are described in relation to FIG. 4. Further, color coding 76 for DPS, multiple 1 or 2, and color or black and white is as described in relation to FIG. 4. Last edit 148 indicates when the page was last edited. Status 150 indicates the current status of the page, for example, complete, in progress, or not started. As with FIG. 4, color coding 78 may be used to indicate whether the page is complete, submitted, in production, or pending unsubmit.

In some embodiments, a build ladder 146 showing partially created or completed pages may not be available. For example, a school using a desk top publishing application may not continually scan pages during the creation process for placement in the Build Ladder 146. Thus, only a template or blank page may be shown. Further, no build ladder 146 may be available in a desktop creation process. Alternately, a scanning and placement process may be used to periodically scan partially created or complete pages of a desk top publishing application for placement in the Build Ladder 146.

Figure 14:
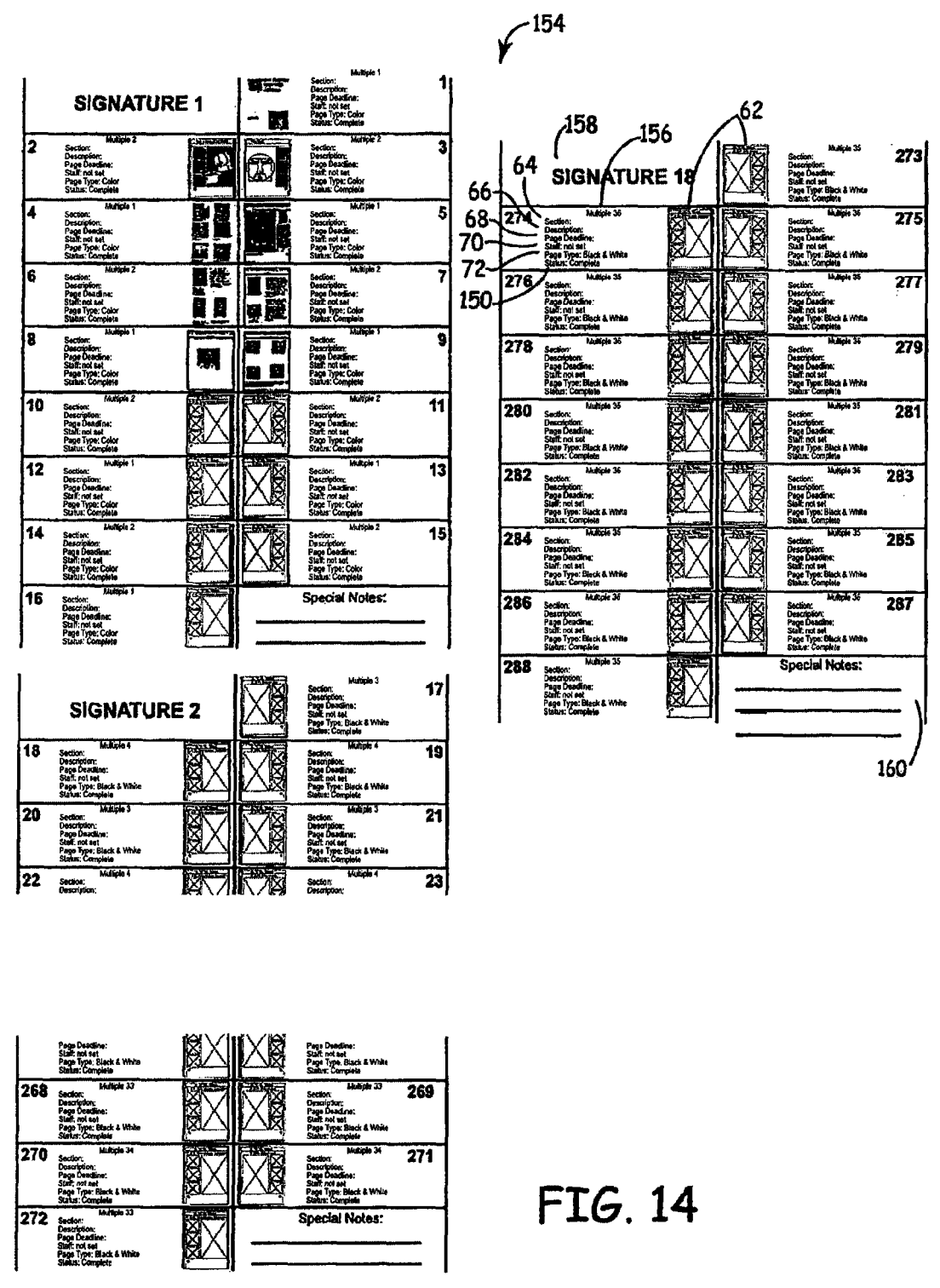

A Printable Ladder 154 may be accessed through either the Planning Ladder 60 or the Build Ladder 146 and is shown in FIG. 14. Like the Planning Ladder 60 and the Build Ladder 146, the Printable Ladder 154 provides a thumbnail image 62 of each page (whether complete, partially created, or still in template form). Associated with each thumbnail 62 is the following information: section 64, description 66, page deadline 68, staff 70, page type 72, and status 150. Also listed is to which multiple 156 the page belongs. Within the Printable Ladder 154, the pages are divided into signatures 158. Thus, for example, the first sixteen pages are associated with Signature 1, the next sixteen pages are associated with Signature 2, etc. Spaces 160 for special notes are given such that the users or staff may write notes into the printed Printable Ladder 154.

Figure 15:
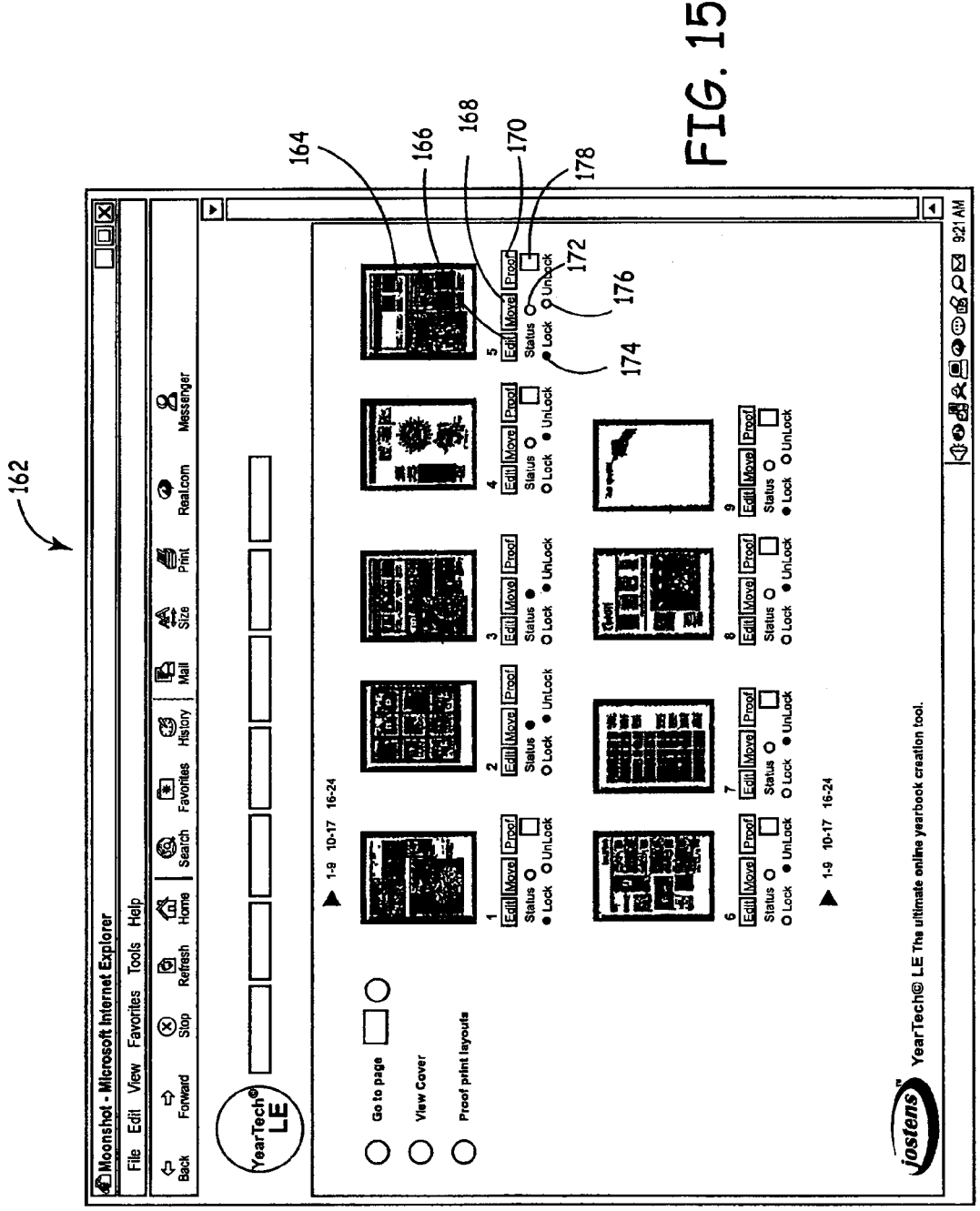
FIG. 15 illustrates a page preview screen in accordance with one embodiment of the present invention.

An alternate embodiment of a screen showing some of the information from the Build Ladder is shown in FIG. 15. FIG. 15 illustrates a page preview screen 162 showing thumbnails 164 of several designed pages. As shown, several thumbnails 164 may be shown on each screen 162. Options may be provided associated with each page, for example under each thumbnail image, allowing the user to choose to edit 166 the page, move 168 the page, or proof 170 the page. Other options may be provided as desired. A status indicator 172 may be provided associated with each page, for example under each thumbnail image 164. The status indicator 172 may change colors when the page has acquired a certain status. For example, if the status indicator is red, it indicates that the page has been submitted to the production facility and the page may be viewed but not edited. Lock and unlock buttons 174 and 176 may also be provided associated with each thumbnail 164. These buttons allow an advisor to lock or unlock pages. When a page is locked, a graphic of a lock 178 appears. A locked page may not be edited unless unlocked. Submitted pages may not be locked or unlocked as submitted pages may not be edited regardless of lock or unlocked status. Lock and unlock options need not be provided.

Figure 16:
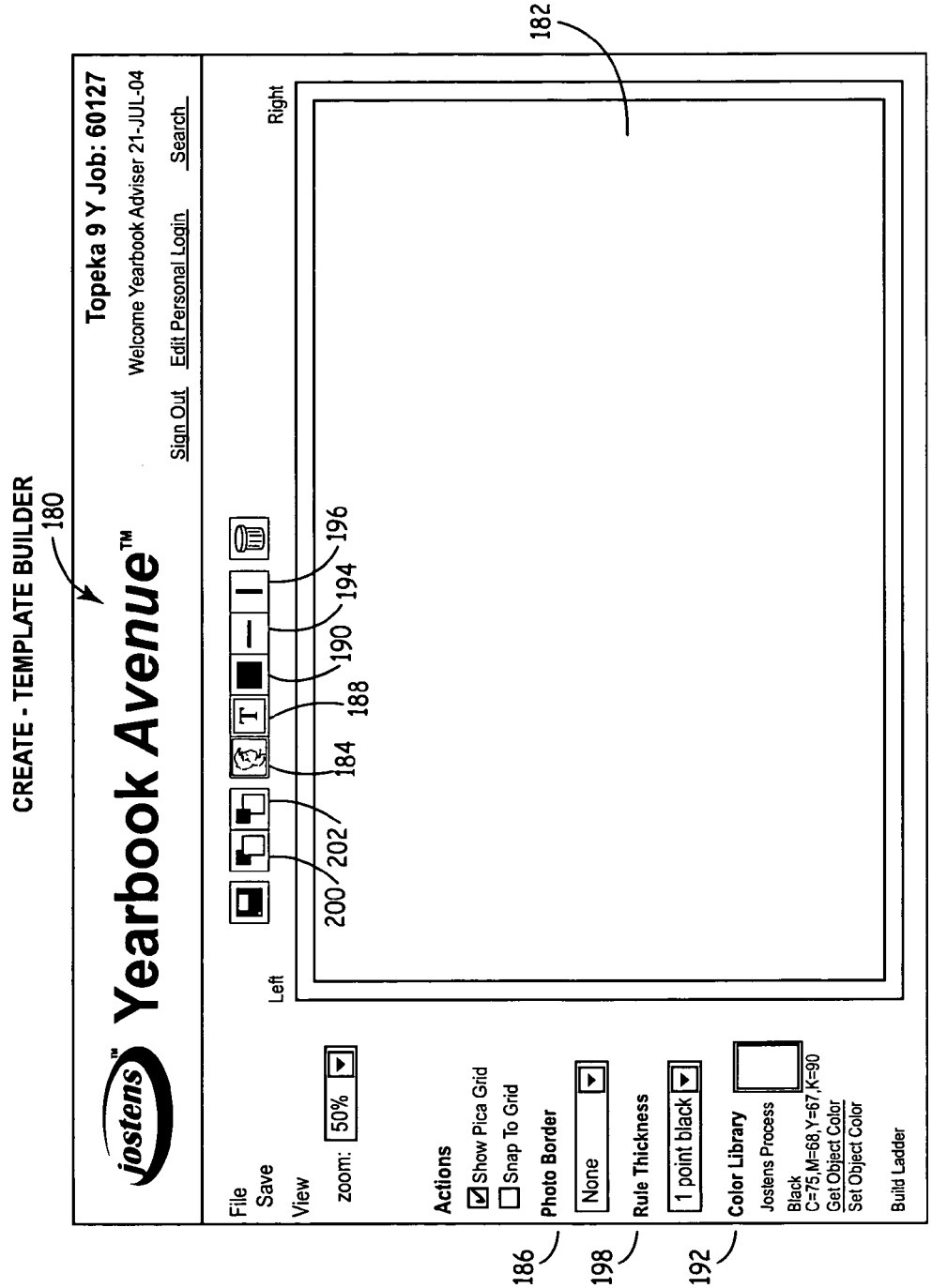
FIG. 16 illustrates a template builder page in accordance with one embodiment of the present invention.

FIG. 16 illustrates a Template Builder 180 in accordance with one embodiment of the present invention. The template builder 180 provides a blank template 182 that may be customized by the user. Photo boxes may be added using the add photo box button 184. A photo border may be added using the drop down menu 186. Text boxes may be added using the add text box button 188. Color boxes may be added using the add color box button 190. The color may be selected from the color library 192. Added boxes may be moved and resized by clicking on the added box. Horizontal rules and vertical rules may be added by clicking on the add horizontal rule button 194 and the add vertical rule button 196 respectively. The rule thickness may be edited by using the drop down menu 198. Send backward and Bring forward buttons 200 and 202, respectively, may be provided for placing a picture box and/or text box in front of or behind another picture box or text box. The template may be saved as a specific template type for future use.

Figure 17:
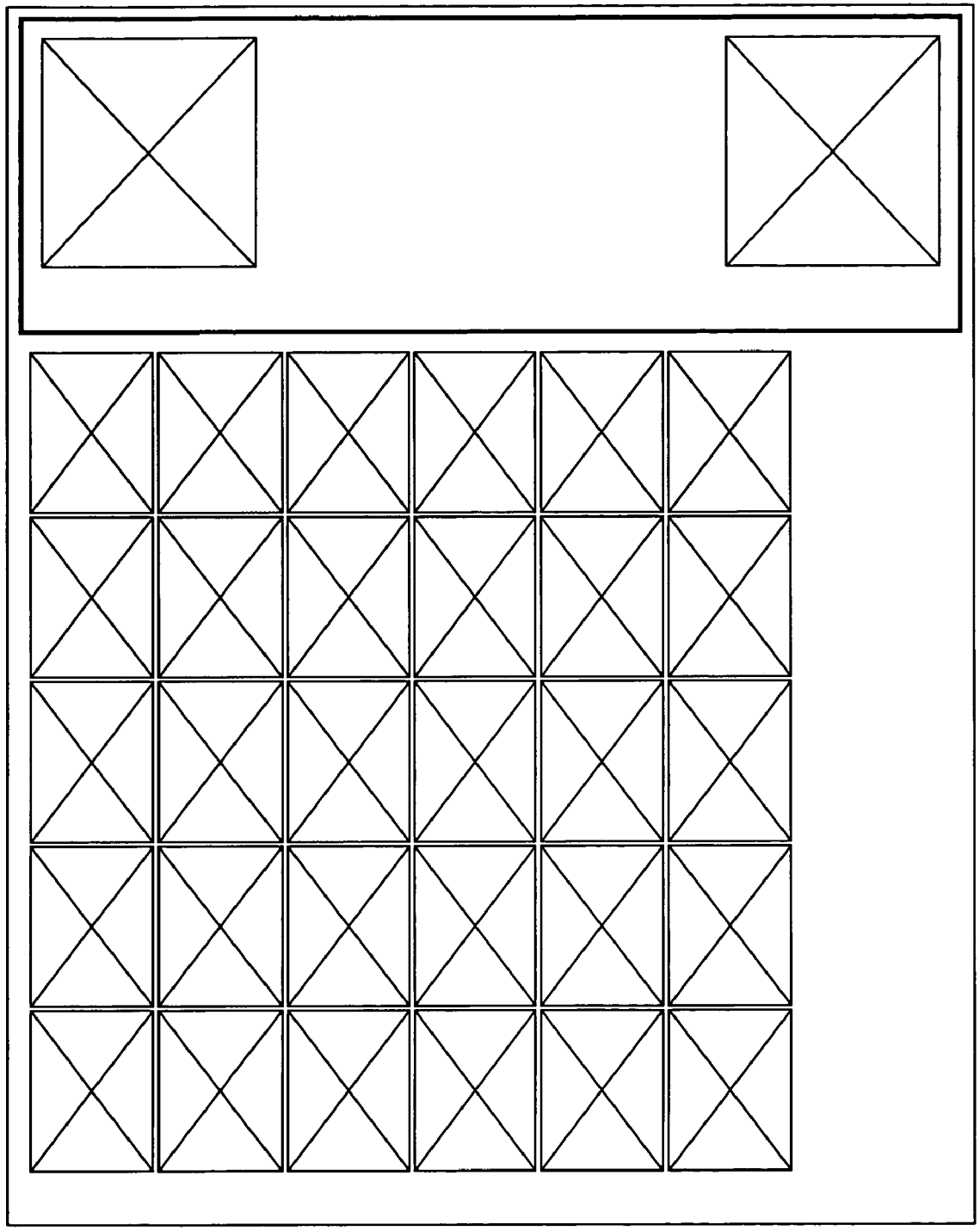
FIG. 17 illustrates a portrait page template in accordance with one embodiment of the present invention.
Figure 18:
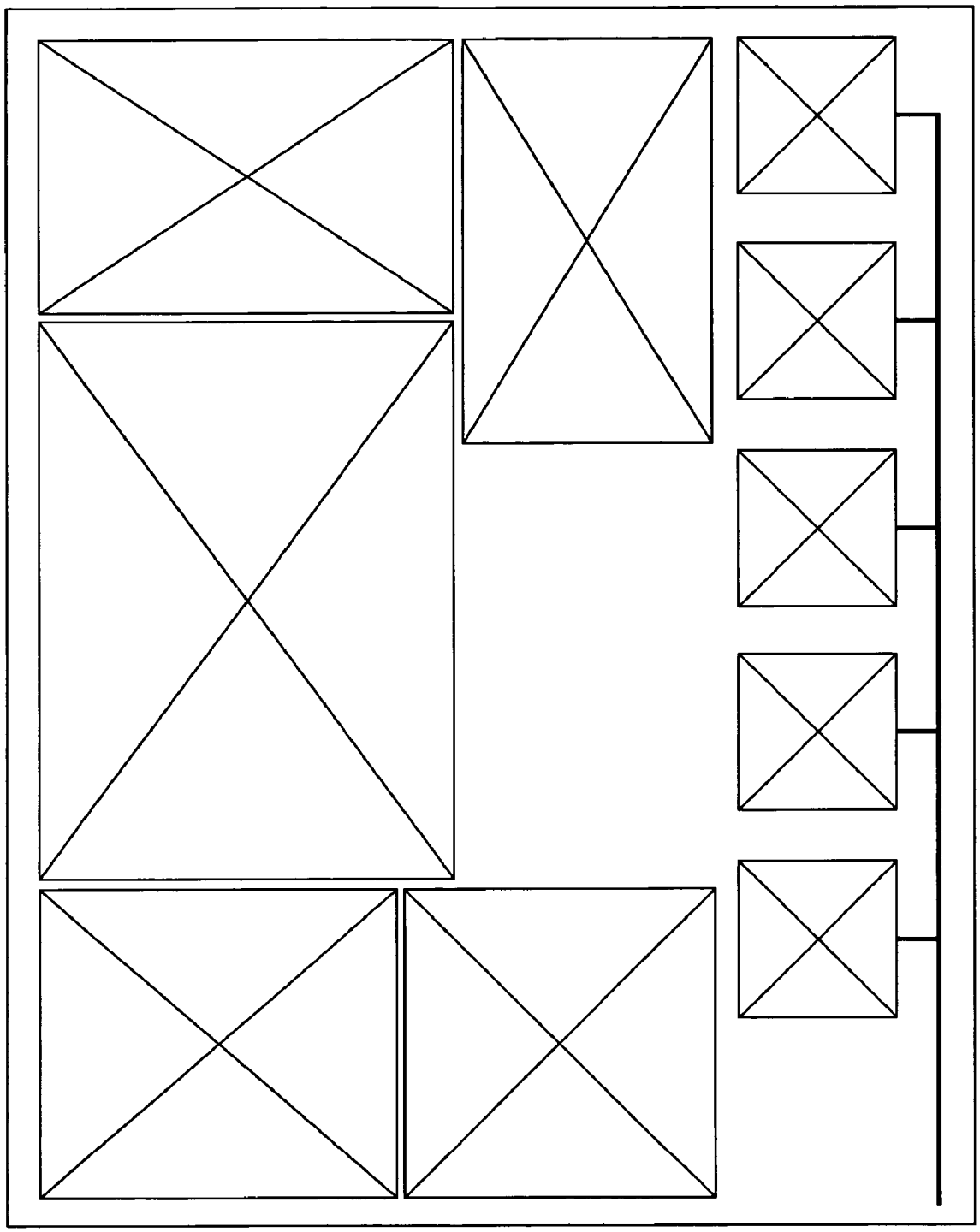
FIG. 18 illustrates an activity page template in accordance with one embodiment of the present invention.
Figure 19:
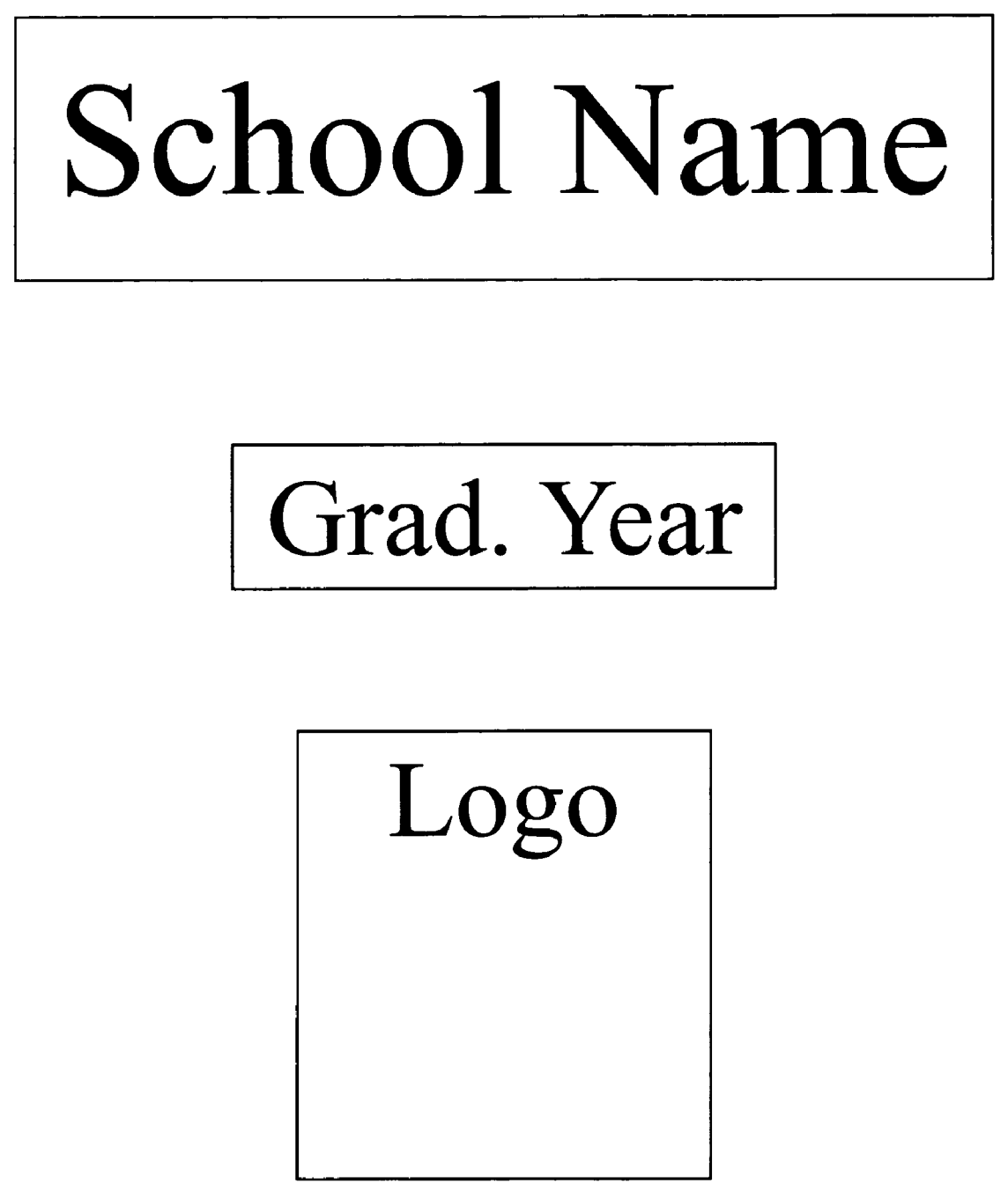

In addition to fully customized templates, standard templates may be provided for user customization, shown in FIGS. 17-19. FIG. 17 illustrates a portrait page template 204. FIG. 18 illustrates an activity page template 206. FIG. 19 illustrates a cover template 208. Of course, the templates shown in FIG. 17-19 are only examples. A wide variation of templates may be provided and used.

Figure 20:
FIG. 20 illustrates a panel pages screen in accordance with one embodiment of the present invention.

A Panel Pages screen 210 is shown in FIG. 20. Panel pages are portrait pages and have the student photos therein. In designing portrait pages, the user is prompted to choose the portrait size. Panel pages are pages in the yearbook devoted to student portraits. Typically, a photographer takes pictures of the students and loads the pictures as digital images onto a CD. The CD is shipped to the production facility and the production facility loads the images into categories. For example, all $10^{th}$ grade student photos are loaded into a $10^{th}$ grade category. Once the images are loaded by production, the school may proof the images and loading for accuracy. For example, duplicate images may be deleted, images in the wrong category may be moved, images of students whose picture was not originally submitted may be added, and student names associated with each photo may be checked. The photos are inserted into a panel page (or portrait page) template chosen by the school. The photos are loaded alphabetically as they would appear in the yearbook. Generally, the process of loading the images into the panel page is an automatic process and is driven by the template chosen by the school. Typically, the school is given a choice of pre-designed templates for selection as the panel pages template. Alternately, the school may design a customized template and then manually place each photo and text on the template.

As shown in FIG. 20, the panel pages screen 210 shows a color-coded status 212 of each page, whether not started, in process, completed page, submitted page, in production, or locked. To place portraits, the user clicks on the page icon they would like the selected category to start on.

Figure 21:
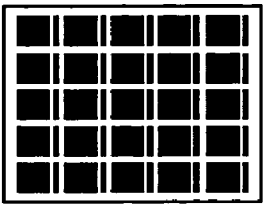
FIG. 21 illustrates a portrait page editing screen in accordance with one embodiment of the present invention.

In an alternate embodiment, shown in FIG. 21, the user may be given several options during selection of a panel page template. The user may choose the portrait window shape 214, for example oval or rectangle. The user may choose where the names are to be placed 216—along the outside edge or below the portraits. The user may further choose the photo size 218 (small, medium large). In an alternate embodiment, the user may choose whether to include the minimum number of portraits per page, the normal number of portraits per page, or the maximum number of portraits per page. Thus, the user is given some flexibility in determining the total number of pages dedicated to portraits. The user designates the category 220 assigned to each page, for example, $10^{th}$ grade.

Figure 22:
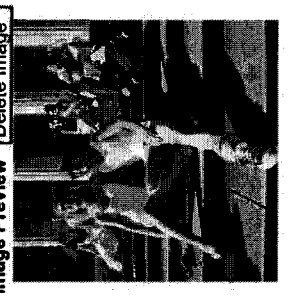
FIG. 22 illustrates an image library page in accordance with one embodiment of the present invention.

An Image Library page is illustrated in FIG. 22. Thumbnails 222 are provided of each of the images within the library. Each image may be given a name 224, associated with an image category 226 and various keywords 228. For example, the names of each student appearing in the each photo may be listed associated with each photo. Images in the image library may be used during yearbook creation. Images must be moved from a staff inbox or community inbox before they may be used. Images may be uploaded to the image library. The image library thus provides a central repository for images that may be used in the yearbook. Once a decision is reached that an image will not be used, it may be deleted from the image library. Deleted images may be stored at a production facility for easy recall.

A photo coverage page may be provided as part of the Create information. The photo coverage page draws on the information associated with the image from the photo library to determine which students appear in which photos currently being used in the yearbook. Further, an index page may be provided listing each student and the page number on which they appear. Thus, the photo coverage page and the index page may be used to track appearance of students in the yearbook.

A Photo Submissions Information page 230 is illustrated in FIG. 23. As shown, the photo submissions information page 230 may include information on the page/photo submission deadlines 232, the page submissions received 234, the page submission totals 236, and the latest page submission message 236. In addition to the deadline date for the page/photo submission deadlines, the number of pages required, the number of photos required, the numbers of photos still needed, and the pages assigned in the ladder may be listed.

Pre-licensed images and news items may also be provided within the Create information. For example, images or news stories from significant world events may be provided available for use by the school in the yearbook. Thus, for example, during an election year, images may be provided of the candidates or of the campaigns. As another example, if the school is located in an area where an earthquake had occurred, images may be provided of the aftermath of the earthquake. Similarly, trademarks or copyrights may be pre-licensed and available for use by the school. For example, particular copyrighted or trademarked graphics may be made available. By having access to pre-licensed images, the school can include a wide array of current events information without having to individually seek out permission.

Using the yearbook system, a custom cover may be designed. Numerous possible combinations of cover workflows include silkscreen, art, foil, embossing, graining, matelay, casemaking, die cutting, lamination, handwork and overtone. Custom cover artwork may be submitted by the school, scanned at the production facility, and made available on the yearbook server. A template for a custom cover may include one large image and no text. Alternately, a stock cover with school personalization, such as school name and mascot, may be used.

A cover information page 238, as shown in FIG. 24, may be provided. The cover information includes both information about the cover 240 and about the endsheets 242. The cover information 240 includes the kind of cover and the trim size. The endsheet information 244 includes the front paper, the front color 1, the front color 2, the back paper, the back color 1, the back color 2, whether a special design was used, whether the front and back endsheets are the same, whether the endsheet has printing on the pages, whether the endsheet is being proofed, the date the proof was sent, and the date the proof was returned.

FIG. 25 illustrates a Messages page 246. Typically, messages are to the advisor and relate to key events. The messages may be automated, such as acknowledging receipt of a submission. Alternately, the messages may have in depth information such as deficiencies or problems with a submission. The messages page 246 facilitates communication to the advisor during yearbook creation.

A Page Status Grid is illustrated at FIG. 26. The page status grid 248 includes information regarding the page grid, the multiples, and the signatures.

A Summary Report 250 is illustrated at FIG. 27. The summary report 250 may list the current book statistics 252, the yearbook options ordered 254, the yearbook cover information 256, the yearbook endsheet information 258, the page/photo submission deadlines 260, the page submissions received 262, the page submission totals 264, the key dates 266, the scheduled deposits 268, the payments received 270, the latest page submission message 272, and the complete page grid 274. A complete proof grid 276 with color coding may also be provided.

A current book statistics field 252 includes information regarding the number of pages, the book size, and the copies planned. A yearbook options field 254 indicates the yearbook options ordered. A yearbook cover information field 256 includes the kind of cover and the trim size. An endsheet information field 258 includes the front paper, the front color 1, the front color 2, the back paper, the back color 1, the back color 2, whether a special design was used, whether the front and back endsheets are the same, whether the endsheet has printing on the pages, whether the endsheet is being proofed, the date the proof was sent, and the date the proof was returned. A page/photo submission deadlines field 260 lists the deadline, the deadline date, the pages required, the photos required, the photos needed, the pages assigned in the ladder, and the deadline completion date. A page submissions received field 262 indicates what pages have been received and the date of receipt of the pages. A page submissions totals field 264 indicates the total number of pages received and the total number of pages needed. A key dates field 266 indicate key dates such as the contract ship date. A scheduled deposits field 268 indicates the deposit, the deposit due, the date due, the balance due, and the status. A payments received field 270 indicates the date and amount received. A latest submission message field 272 shows the latest submission message. A complete page grid field 274 lists the page grid, the multiples and the signatures. A color coded complete grid 276 provides a box for each page. The boxes may be color coded according to a color status code legend.

Sell

The yearbook system home page 34 provides a Sell tab 44 for accessing Sell information. The Sell information includes information and tools useful for yearbook staff to market and sell the yearbook. Generally, the Sell information includes both school specific information and informational content. The informational content is typically dynamic.

A HOME flyer page 278 is shown in FIG. 28. The HOME (Home Ordering Made Easy) program allows yearbook staff to promote their yearbook with a colorful flyer that can be custom created online. The HOME program is an optional tool that may be used by yearbook staff.

Information from the photo coverage and index pages may be used to incentivize particular parents or students to place orders. For example, if a particular student is identified as having not purchased a yearbook, a flyer may be printed including a page of the yearbook having a picture of that student. The flyer, thus, shows an example of where the student appears in the yearbook.

A HOME web sales page 280 may be associated with the HOME program and is shown in FIG. 29. The HOME web sales page 280 shows the HOME sales results to date for any credit card purchases made on-line for the flyers.

Example informational content in the Sell category includes software for processing payments, such as ItPays software.

Distribute

The yearbook system home page 34 provides a Distribute tab 46 for accessing Distribute information. The Distribute information includes information and tools useful for yearbook staff to market and sell the yearbook. Generally, the Distribute information includes informational content. The informational content is typically dynamic.

The Distribute information includes tools for distribution. These tools are typically dynamic content and may be changed frequently. The distribute information may offer posters or promotional materials for display in the school.

Challenges with distribution often arise from yearbook options chosen by students—for example, a personalized yearbook or a yearbook with signature pages for signing.

Help

The yearbook system home page 34 provides a Help tab 49 for accessing Help information for aiding users in using the yearbook system. Generally, the Help information includes informational content. The informational content is typically dynamic.

Example help pages provided within the Help information include a help screen regarding the yearbook system as a whole, a help screen regarding an online yearbook creation tool, a help screen regarding ItPays software, an interactive help screen, or a page with helpful links.

Contact Us

The yearbook system home page 34 provides a Contact Us tab 51 for accessing Contact Us information. The Contact Us information includes information and tools useful for yearbook staff to contact a representative or production facility. Generally, the Contact Us information includes both school specific information and informational content. The informational content is typically dynamic.

Figure 30:
FIG. 30 illustrates a contact information page in accordance with one embodiment of the present invention.

A contact information page 282 is shown in FIG. 30. The contact information page 282 may provide contact information for a yearbook system representative, for technical support, and for after hours technical support. By providing an easily accessible page having such information, yearbook staff may easily resolve questions or issues.

The Contact Us information may also provide a page for providing feedback regarding the yearbook system. Further, the Contact Us information may provide a page for accessing feedback regarding the yearbook system provided by others.

Supplies

The yearbook system home page 34 provides a Supplies tab 53 for accessing Supplies information. The Supplies information includes supplies and ordering information for such supplies. The supplies may include, for example, generic posters or flyers advertising sales of the yearbook. Generally, the Supplies information includes both school specific information and informational content. The informational content is typically dynamic.

Thus, the yearbook system provides a tool for use by yearbook staff from the start to the finish of the yearbook process. The yearbook system may be used for educating yearbook staff regarding the yearbook process, for planning the yearbook, for creating the yearbook, for selling the yearbook (including merchandising), and for distributing the yearbook.

Yearbook System Management and Production

The yearbook system management and production can be thought of as the back-end of the yearbook system. That is, the yearbook system management works with the schools during creation—storing input information, communicating with the school, etc. The production facility ultimately produces the yearbook.

Figure 31:
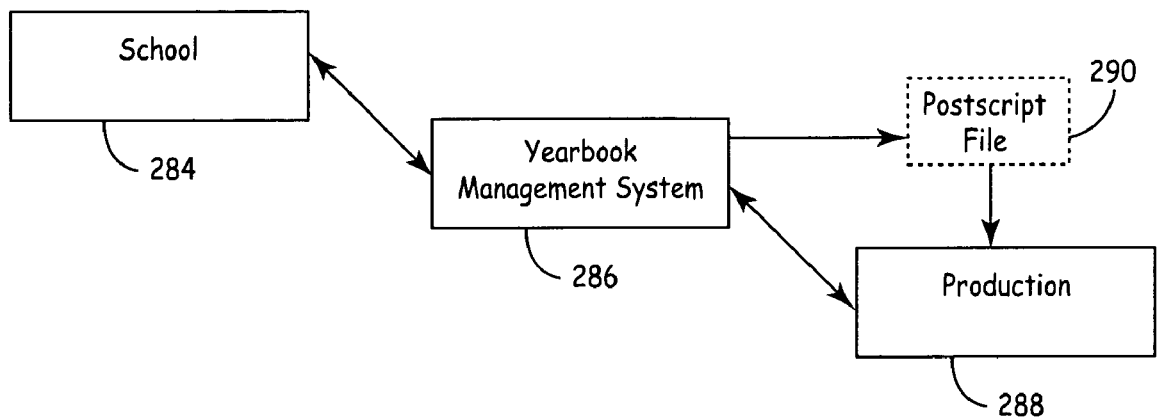
FIG. 31 illustrates the flow of communication between yearbook staff, a yearbook system management, and a production facility in accordance with one embodiment of the present invention.

Seamless running of the yearbook system involves extensive communication between the yearbook staff, the yearbook system management, and the production facility. FIG. 31 illustrates the flow of communication between the school 284 or yearbook staff, the yearbook system management 286, and the production facility 288. The yearbook process spans several months—generally from the start of the school year until mid to late spring. If communication is not ongoing during the entire yearbook process, it may be very difficult to finalize the yearbook on time. For example, if deficiencies with submissions are not identified and address throughout the process and are, instead, identified and addressed only after all pages have been submitted, there may not be sufficient time for the staff to correct the deficiencies and still have the yearbook produced on schedule.

As shown in FIG. 31, generally there is extensive communication between the school 284 and the yearbook system management 286. This communication includes submissions by the school 284, for example photo submissions or page submissions and responses from the yearbook system management 286. For example, the school 284 may submit physical photos to the production facility for scanning. The production facility 288 scans the photos. The photos are made available on a yearbook server at the yearbook system management 286. The yearbook system management 286 notifies the school 284 that the photos are available. Similarly, a school 284 may submit completed pages to the yearbook system management. The yearbook system management 286 acknowledges receipt of the submission. Once the page is submitted, all the information of the page is written into a postscript file 290 and sent to the production facility 288. A pdf file of the submitted page is made and reviewed by production facility. If there are deficiencies in the submission, the yearbook system management 286 notifies the school 284 so that the school 284 can correct the deficiencies and re-submit the page. The pdf pages will be further processed in the production facility and printed using appropriate out devices.

Figure 32:
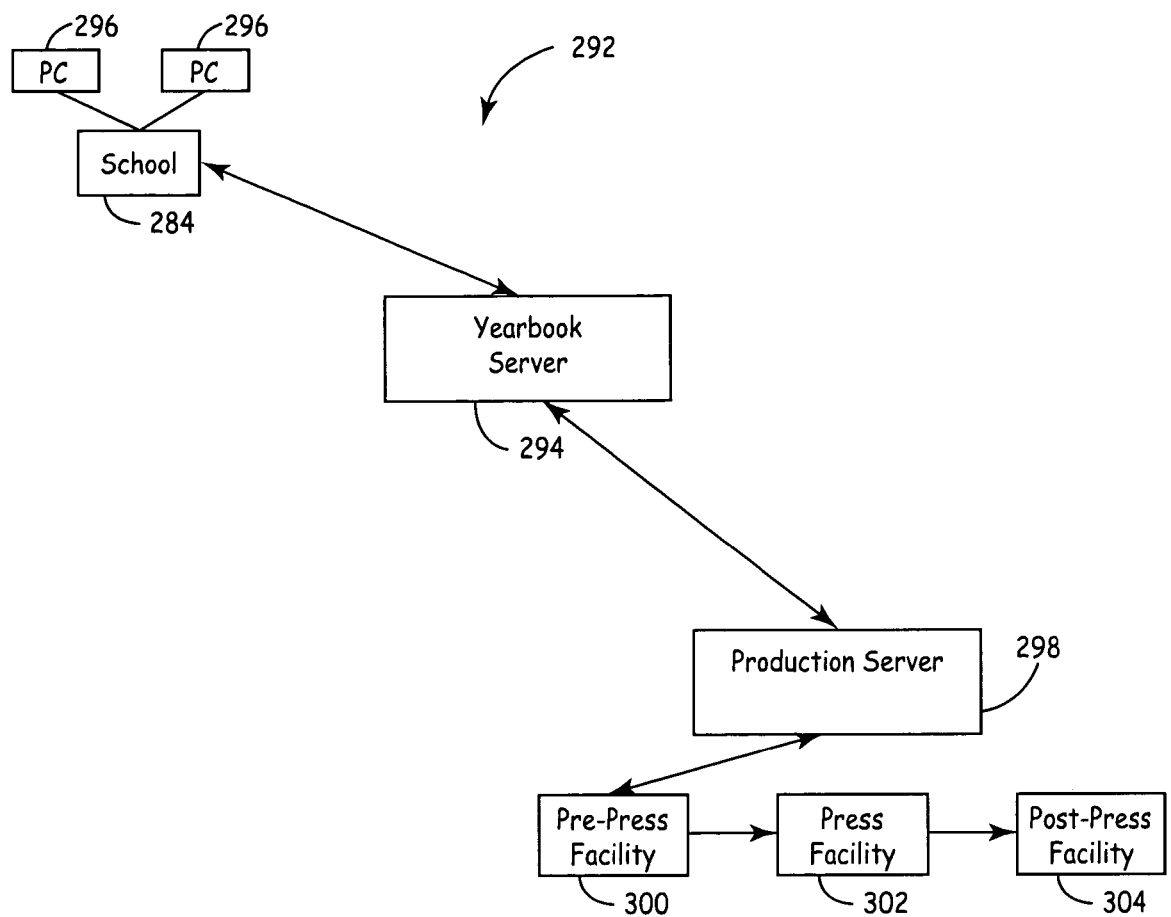
FIG. 32 illustrates a block diagram of the components of a yearbook system in accordance with one embodiment of the present invention.

FIG. 32 illustrates a block diagram of the components of the yearbook system. The yearbook system 292 includes a yearbook server 294 at the yearbook system management. Users at the school 284 communicate with the yearbook server 294 via the internet using individual personal computers 296 (or other suitable device, for example, a PDA).

The yearbook server 294 includes and communicates with the personal computers 296 via the internet or other suitable connection, receiving user creation information, prompting users for further information when necessary, and transmitting information to the user. The yearbook server 294 further communicates with a production server 298 at the production facility to update the production Database 298 such that the yearbook database 294 and production database 298 are in sync. Note that each of the yearbook server 294 and the production server 298 may be database servers. The production facility may be several facilities including a pre-press facility 300, a press facility 302, and a post-press facility 304. Alternately, these several facilities may be provided in a single facility. The production server 298 periodically synchronizes with the yearbook server 294, for example, in providing specific customer images to the yearbook server.

Figure 33:
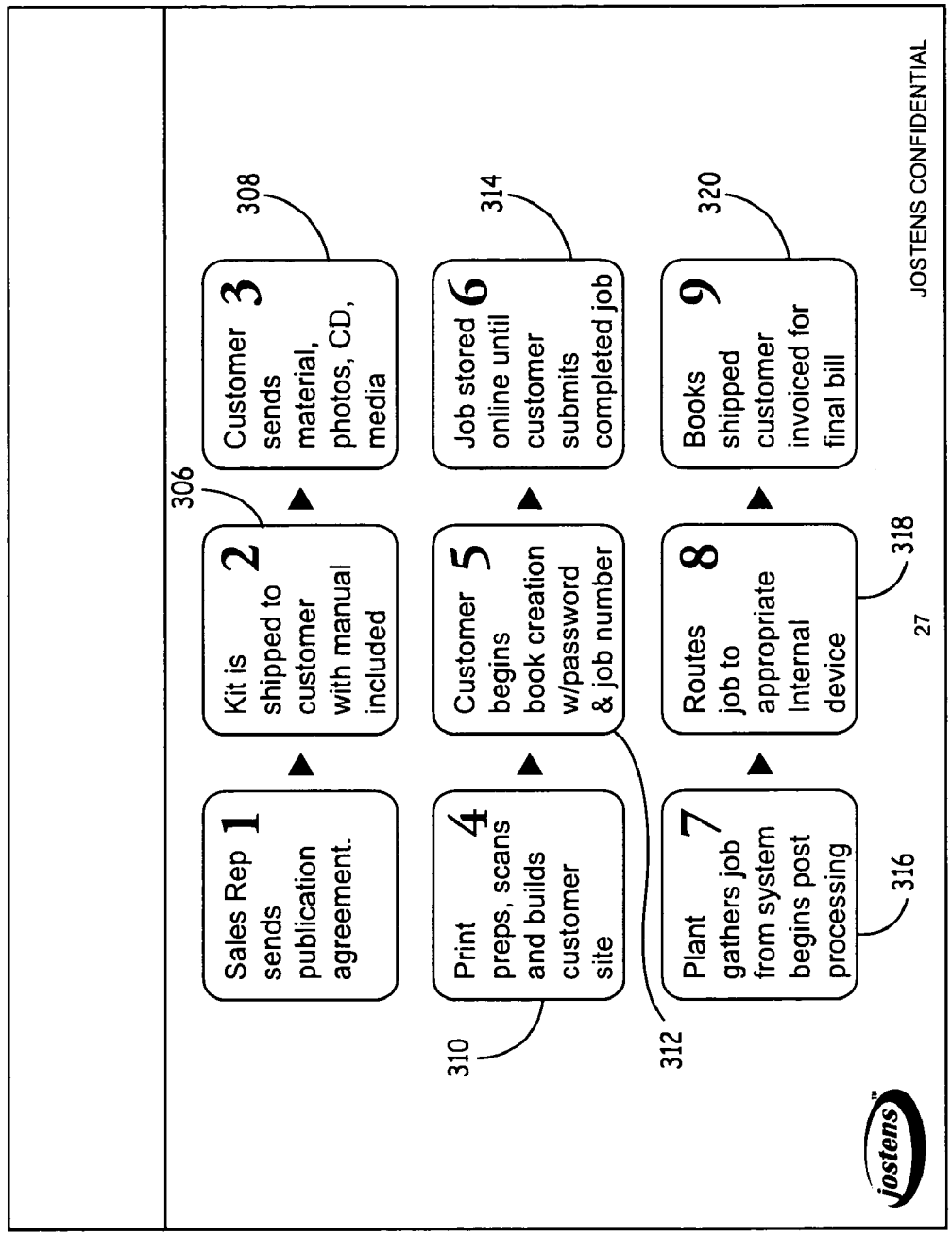
FIG. 33 illustrates a block diagram of creating a yearbook in accordance with one embodiment of the present invention.

FIG. 33 is a block diagram of the overall process of creating a yearbook using the present invention. After the user has initiated the process, a kit is shipped to the user, shown at block 306. This kit may include a shipping carton, mounting sheets, photo sorting envelopes, an instruction manual, and a return shipping carton. While the creation of yearbooks in accordance with the present invention generally is online, there are portions of the yearbook creation that may deal with non-digital or non-electronic items. For example, not all photographs may be available in digital form. These photographs may be scanned in by the school or may be shipped to the pre-press production facility for scanning in. Thus, as shown at block 308, the user may send material, photos, CDs, and media to the pre-press production facility (anything sent by the user may be returned after processing). Shown at block 310, the pre-press production facility preps, scans and uploads the materials to the user site. Access to the user site may be username, password, and/or job number secured. The user creates the yearbook using the password and/or job number, as shown at block 312. The created pages, is stored at the yearbook server until the user submits the completed page, shown at block 314. Once the user has submitted the completed page, the yearbook server gathers the page and transmits the page to a production server to begin post processing, shown at block 316. The production server routes portions of the job to the appropriate section of the production facility, shown at block 318, for example to the press facility for printing yearbook pages. After completed, the post-press facility ships the yearbooks to the user, shown at block 320.

Figure 34:
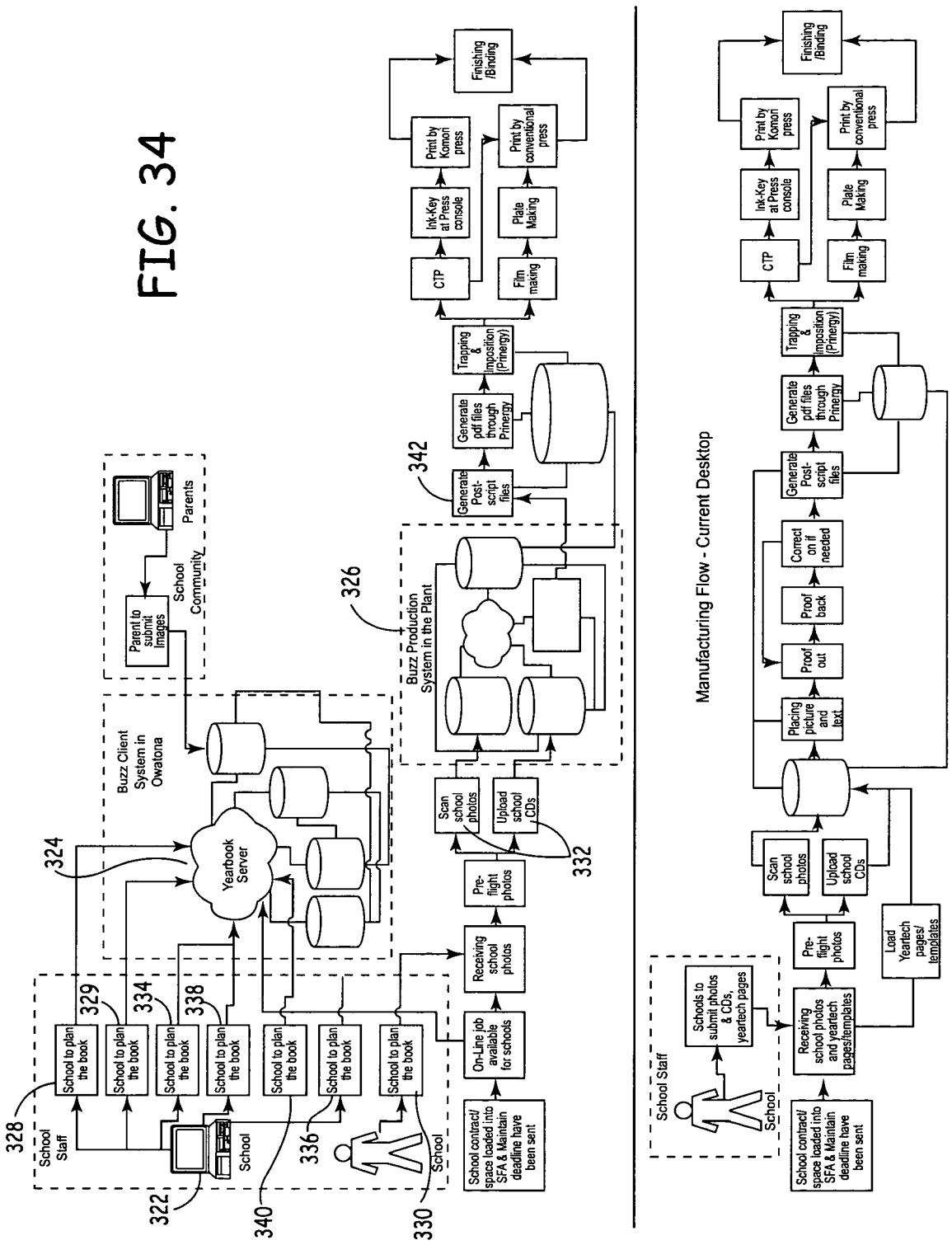
FIG. 34 illustrates a process of creating a yearbook using the components of a yearbook system in accordance with one embodiment of the present invention.

FIG. 34 illustrates a juxtaposition of the process of FIG. 33 on the components of FIG. 32. The school 322 plans the yearbook, shown at block 328, and uploads images, shown at block 329. Additionally, as shown at block 330, the school 322 may submit photos, CDs and other materials to the production facility 326. These images are scanned or uploaded by pre-press facility, shown at block 332, and transmitted as low resolution images to the yearbook server 324 for access by the school 322. Using an online creation system, the school 322 builds and submits pages, shown at blocks 334 and 336, to the yearbook server 324. The school may selfproof pages on the screen, shown at block 338, and check page status online, shown at block 340. Once submitted, the pages are transmitted to the production server 326 as a postscript file, shown at block 342. The production server processes the pages for printing, for example, translating the submitted pages into a format for proceeding through the regular preparation for production of the yearbook, print them and finish the yearbooks.

Figure 35:
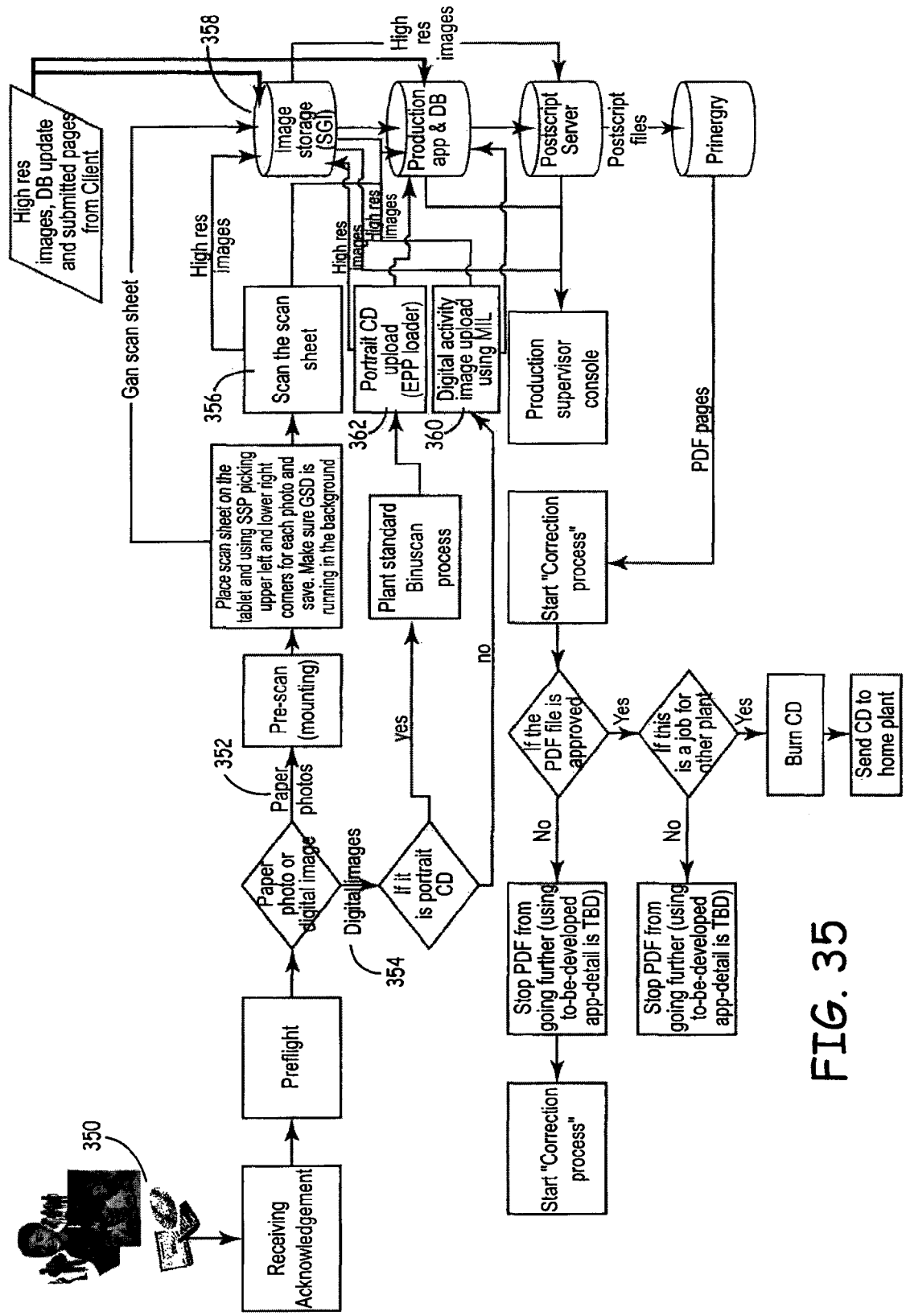
FIG. 35 illustrates a process for pre-press scanning of images in accordance with one embodiment of the present invention.

FIG. 35 illustrates a completed production operating process. Upon receipt of the materials 350 for scan and upload, the material is associated with a job number and category name. Typically, customer photos include activity photos and portrait photos and may be formatted as physical photos 352 or as digital images 354 on photo CDs. Physical photos are batch scanned 356 and disassembled into individual images and uploaded to production image storage 358 using production software to communicate with the production database. Activity photo CDs may be uploaded 360 to the production image storage 358 using suitable production software to communicate with the production server. Portrait CDs may be received from school photographers. Portrait CDs typically include portrait images associated with a student name list. The portrait images and student name list may be uploaded 362 to the production image storage 358 using suitable production software to communicate with the production database. Once the images are uploaded to the production image storage, a low resolution version of the images and thumbnails may be generated. Those low resolution images and thumbnails are synced to yearbook server for school use in yearbook creation. High resolution images stored in production image storage are used when the postscript file is generated.

The job may be archived for future access, for example for reprints. One suitable manner of archiving is to convert the "pages" created using the present invention into PDF files. The PDF files may then be archived on an archiving server or on media. Alternately, if desired, individual images may be archived.

Although the present invention has been described with reference to preferred embodiments, persons skilled in the art will recognize that changes may be made in form and detail without departing from the spirit and scope of the invention.

What is claimed is:

1. A yearbook system comprising:
a user component through which a user may design and create a yearbook, the user component including a user interface, user-specific content, and informational content, wherein the user component includes:
a planning ladder comprising a thumbnail image of each page, wherein the thumbnail image shows one of a complete, a partially created, or a template page; and
a build ladder comprising a thumbnail image of each page, wherein the thumbnail image shows one of a complete, a partially created, or a template page; and
a production component through which the yearbook is converted to a printed output;
wherein the user component and the production component interact such that submissions are made to the production component via the user component and the production component notifies the user component regarding any deficiencies in the submissions and the user component corrects the submission deficiencies and re submits.

2. The yearbook system of claim 1, wherein information regarding the page is associated with the thumbnail image of the page.

3. The yearbook system of claim 2, wherein the information includes section, description, deadline, staff, page type, or template.

4. A yearbook system comprising:
a user component through which a user may design and create a yearbook, the user component including a user interface, user specific content, and informational content, the user component further including:
a virtual book for virtual viewing of yearbook pages completed, in progress, and not yet started;
a planning ladder comprising a thumbnail image of each page of the yearbook, wherein information regarding each page is associated with the thumbnail image of the page, and wherein the information includes at least a name of the user responsible for the page; and
a build ladder comprising a thumbnail image of each page of the yearbook, wherein information regarding each page is associated with the thumbnail image of the page, and wherein the information includes at least a page deadline and a last edit; and
a production component through which the yearbook is converted to a printed output,
wherein the user component and the production component interact such that submissions are made to the production component via the user component and the production component communicates with the user component regarding the submissions.

5. The yearbook system of claim 4, wherein the user component includes tools for planning the yearbook, for creating the yearbook, for selling the yearbook, and for distributing the yearbook.

6. The yearbook system of claim 4, wherein the user component includes a visual representation of progress of the yearbook towards completion.

7. The yearbook system of claim 4, wherein the user component includes a photo submission component for accepting photos submitted by community members.

8. The yearbook system of claim 4, wherein the user component comprises at least two access levels such that an advisor may access information at one level and staff may access information at another level.

9. The yearbook system of claim 4, wherein the user component may be used to plan and develop portrait pages and activity pages.

10. The yearbook system of claim 4, wherein the user component includes coverage information for tracking coverage of students in the yearbook.

11. The yearbook system of claim 4, wherein the production component is designed to communicate with the user component regarding inadequacy of submissions and requiring correction and resubmission of the submissions.

12. The yearbook system of claim 4, wherein the production component comprises a yearbook system management component and a yearbook production system component.

13. The yearbook system of claim 12, wherein the yearbook system management component is designed to communicate with the user during yearbook creation.

14. The yearbook system of claim 4, wherein the production component stores input information.

15. The yearbook system of claim 4, wherein the production component comprises a yearbook server and a production server.

16. The yearbook system of claim 4, wherein the system is configured for interaction with a school, a school community, a sales force, customer support, and manufacturing.

17. The yearbook system of claim 4, wherein the user component enables the user to create the yearbook using a desk top publishing application.

18. The yearbook system of claim 4, wherein the user component enables the user to create the yearbook using an on-line creation tool.

19. A method for creating a yearbook comprising:
user planning of the yearbook, wherein the user planning of the yearbook comprises:
incorporating planning sections into a planning ladder, the planning ladder comprising a thumbnail image of each page of the yearbook, wherein information regarding each page is associated with the thumbnail image of the page, and wherein the information includes at least a name of the user responsible for the page;
incorporating sections into a build ladder, the build ladder comprising a thumbnail image of each page of the yearbook, wherein information regarding each page is associated with the thumbnail mage of the page, and wherein the information includes at least a page deadline and a last edit; and
user development of the yearbook;
user submission of completed portions of the yearbook;
production review of the submitted portions of the yearbook;
production communication to the user regarding the submitted portions of the yearbook; and
production conversion of the submitted portions of the yearbook into a printed output.

20. The method of claim 19, wherein the user planning of the yearbook comprises user planning of each portion of the yearbook including cover, portrait pages, and activity pages.

21. The method of claim 20, wherein the user development of the yearbook comprises development of each page laid out during user planning of the yearbook.

22. The method of claim 19, further comprising user submission of photos.

23. The method of claim 22, further comprising production scanning of the submitted photos.

24. The method of claim 19, further comprising production creation of a postscript file for completed portions of the yearbook.

25. A yearbook system comprising:
a user component through which a user may design and create a yearbook, the user component including a user interface, user-specific content, and informational content, wherein the user component includes:
   a planning ladder comprising a thumbnail image of each page of the yearbook, wherein information regarding each page is associated with the thumbnail image of the page, and wherein the information includes at least a name of the user responsible for the page; and
   a build ladder comprising a thumbnail image of each page of the yearbook, wherein information regarding each page is associated with the thumbnail image of the page, and wherein the information includes at least a page deadline and a last edit; and
a production component through which the yearbook is converted to a printed output;
wherein the user component and the production component interact such that submissions are made to the production component via the user component and the production component communicates with the user component regarding the submissions.

* * * * *